(12) United States Patent
Mazzagatti et al.

(10) Patent No.: US 7,593,923 B1
(45) Date of Patent: Sep. 22, 2009

(54) FUNCTIONAL OPERATIONS FOR ACCESSING AND/OR BUILDING INTERLOCKING TREES DATASTORES TO ENABLE THEIR USE WITH APPLICATIONS SOFTWARE

(75) Inventors: Jane Campbell Mazzagatti, Blue Bell, PA (US); Jane Van Keuren Claar, Bethlehem, PA (US); Tony T. Phan, Abington, PA (US)

(73) Assignee: Unisys Corporation, Blue Bell, PA (US)

( * ) Notice: Subject to any disclaimer, the term of this patent is extended or adjusted under 35 U.S.C. 154(b) by 533 days.

(21) Appl. No.: 10/879,329

(22) Filed: Jun. 29, 2004

(51) Int. Cl.
*G06F 17/30* (2006.01)
(52) U.S. Cl. .............................. 707/3; 704/248; 706/45
(58) Field of Classification Search ................. None
See application file for complete search history.

(56) References Cited

U.S. PATENT DOCUMENTS

| | | |
|---|---|---|
| 4,286,330 A | 8/1981 | Isaacson |
| 5,245,337 A | 9/1993 | Bugajski |
| 5,293,164 A | 3/1994 | Bugajski |
| 5,592,667 A | 1/1997 | Bugajski |
| 5,630,125 A | 5/1997 | Zellweger |
| 5,634,133 A | 5/1997 | Kelley |
| 5,829,004 A | 10/1998 | Au |
| 5,894,311 A | 4/1999 | Jackson |
| 5,918,229 A | 6/1999 | Davis et al. |
| 5,930,805 A | 7/1999 | Marquis |
| 5,963,965 A | 10/1999 | Vogel |

(Continued)

FOREIGN PATENT DOCUMENTS

EP   0 079 465   1/1985

(Continued)

OTHER PUBLICATIONS

Gschia-Yuan Teng & David L. Neuhoff, "An Improved Hierarchical Lossless Text Compression Algrithm", Proceedings 1995 Data Compression Conference.

(Continued)

*Primary Examiner*—Hosain T Alam
*Assistant Examiner*—Johnese Johnson
(74) *Attorney, Agent, or Firm*—Robert P. Marley; Richard J. Gregson

(57) ABSTRACT

A set of mechanisms handles communication with a Knowledge Store and its K Engine(s). The Knowledge Store (Kstore) does not need indexes or tables to support it but instead is formed by the construction of interlocking trees of pointers in nodes of the interlocking trees. The K Engine builds and is used to query a KStore by using threads that use software objects together with a K Engine to learn particlized events, thus building the KStore, and these or other software objects can be used to make queries and get answers from the KStore, usually with the help of a K Engine. Under some circumstances, information can be obtained directly from the KStore, but is generally only available through the actions of the K Engine. The mechanisms provide communications pathways for users and applications software to build and/or query the KStore. Both these processes can proceed simultaneously, and in multiple instances. There can be a plurality of engines operating on a KStore essentially simultaneously. Additionally a mechanism for providing triggers allows for automatic reporting of events, conditions and occurrences to users and applications.

35 Claims, 12 Drawing Sheets

U.S. PATENT DOCUMENTS

| | | |
|---|---|---|
| 5,966,709 A | 10/1999 | Zhang |
| 5,970,490 A | 10/1999 | Morgenstern |
| 5,978,794 A | 11/1999 | Agrawal et al. |
| 5,983,232 A | 11/1999 | Zhang |
| 6,018,734 A | 1/2000 | Zhang |
| 6,029,170 A | 2/2000 | Garger |
| 6,031,993 A | 2/2000 | Andrews et al. |
| 6,102,958 A | 8/2000 | Meystel |
| 6,115,715 A | 9/2000 | Traversat et al. |
| 6,138,115 A | 10/2000 | Agrawal et al. |
| 6,138,117 A | 10/2000 | Bayardo |
| 6,144,962 A | 11/2000 | Weinberg et al. |
| 6,160,549 A | 12/2000 | Touma et al. |
| 6,233,575 B1 | 5/2001 | Agrawal et al. |
| 6,275,817 B1 | 8/2001 | Reed et al. |
| 6,278,987 B1 | 8/2001 | Reed et al. |
| 6,286,002 B1 | 9/2001 | Axaopoulos et al. |
| 6,341,281 B1 | 1/2002 | MacNicol et al. |
| 6,356,902 B1 | 3/2002 | Tan et al. |
| 6,360,224 B1 | 3/2002 | Chickering |
| 6,373,484 B1 | 4/2002 | Orell et al. |
| 6,381,600 B1 | 4/2002 | Lau |
| 6,389,406 B1 | 5/2002 | Reed et al. |
| 6,394,263 B1 | 5/2002 | McCrory |
| 6,453,314 B1 | 9/2002 | Chan et al. |
| 6,470,277 B1 | 10/2002 | Chin et al. |
| 6,470,344 B1 | 10/2002 | Kothuri et al. |
| 6,473,757 B1 | 10/2002 | Garofalakis et al. |
| 6,477,683 B1 | 11/2002 | Killian et al. |
| 6,499,026 B1 | 12/2002 | Rivette et al. |
| 6,505,184 B1 | 1/2003 | Reed et al. |
| 6,505,205 B1 | 1/2003 | Kothuri et al. |
| 6,581,063 B1 | 6/2003 | Kirkman |
| 6,591,272 B1 | 7/2003 | Williams |
| 6,604,114 B1 | 8/2003 | Toong et al. |
| 6,615,202 B1 | 9/2003 | Ding et al. |
| 6,624,762 B1 | 9/2003 | End, III |
| 6,635,089 B1 | 10/2003 | Burkett et al. |
| 6,662,185 B1 | 12/2003 | Stark et al. |
| 6,681,225 B1 | 1/2004 | Uceda-Sosa et al. |
| 6,684,207 B1 | 1/2004 | Greenfield et al. |
| 6,691,109 B2 | 2/2004 | Bjornson et al. |
| 6,704,729 B1 | 3/2004 | Klein et al. |
| 6,711,585 B1 | 3/2004 | Copperman et al. |
| 6,745,194 B2 | 6/2004 | Burrows |
| 6,748,378 B1 | 6/2004 | Lavender et al. |
| 6,751,622 B1 | 6/2004 | Puri et al. |
| 6,760,720 B1 | 7/2004 | De Bellis |
| 6,768,995 B2 | 7/2004 | Thier et al. |
| 6,769,124 B1 | 7/2004 | Schoening et al. |
| 6,792,432 B1 * | 9/2004 | Kodavalla et al. ....... 707/103 R |
| 6,799,184 B2 | 9/2004 | Bhatt et al. |
| 6,804,688 B2 | 10/2004 | Kobayashi et al. |
| 6,807,541 B2 | 10/2004 | Bender et al. |
| 6,816,856 B2 | 11/2004 | Baskins et al. |
| 6,826,556 B1 | 11/2004 | Miller et al. |
| 6,831,668 B2 | 12/2004 | Cras et al. |
| 6,868,414 B2 | 3/2005 | Khanna et al. |
| 6,900,807 B1 | 5/2005 | Liongosari et al. |
| 6,920,608 B1 | 7/2005 | Davis |
| 6,931,401 B2 | 8/2005 | Gibson et al. |
| 6,952,736 B1 | 10/2005 | Westbrook |
| 6,965,892 B1 | 11/2005 | Uceda-Sosa et al. |
| 7,027,052 B1 | 4/2006 | Thorn et al. |
| 7,228,296 B2 | 6/2007 | Matsude |
| 2002/0124003 A1 | 9/2002 | Rajasekaran et al. |
| 2002/0138353 A1 | 9/2002 | Schreiber et al. |
| 2002/0143735 A1 | 10/2002 | Ayi et al. |
| 2002/0143783 A1 | 10/2002 | Bakalash et al. |
| 2002/0188613 A1 | 12/2002 | Chakraborty et al. |
| 2002/0194173 A1 | 12/2002 | Bjornson et al. |
| 2003/0009443 A1 | 1/2003 | Yatviskly |
| 2003/0033279 A1 | 2/2003 | Gibson et al. |
| 2003/0093424 A1 | 5/2003 | Chun et al. |
| 2003/0115176 A1 | 6/2003 | Bobroff et al. |
| 2003/0120651 A1 | 6/2003 | Bernstein |
| 2003/0204513 A1 | 10/2003 | Bumbulis |
| 2003/0204515 A1 | 10/2003 | Shadmon et al. |
| 2003/0217335 A1 | 11/2003 | Chung et al. |
| 2004/0107186 A1 | 6/2004 | Najork et al. |
| 2004/0133590 A1 | 7/2004 | Henderson et al. |
| 2004/0143571 A1 | 7/2004 | Bjornson et al. |
| 2004/0169654 A1 | 9/2004 | Walker et al. |
| 2004/0230560 A1 | 11/2004 | Elza et al. |
| 2004/0249781 A1 | 12/2004 | Anderson |
| 2005/0015383 A1 | 1/2005 | Harjanto |
| 2005/0050054 A1 | 3/2005 | Clark et al. |
| 2005/0060325 A1 | 3/2005 | Bakalash et al. |
| 2005/0071370 A1 | 3/2005 | Atschul et al. |
| 2005/0080800 A1 | 4/2005 | Parupudi et al. |
| 2005/0097108 A1 | 5/2005 | Wang et al. |
| 2005/0102294 A1 | 5/2005 | Coldewey |
| 2005/0149503 A1 | 7/2005 | Raghavachari |
| 2005/0171960 A1 | 8/2005 | Lomet |
| 2005/0179684 A1 | 8/2005 | Wallace |
| 2005/0198042 A1 | 9/2005 | Davis |
| 2005/0262108 A1 | 11/2005 | Gupta |

FOREIGN PATENT DOCUMENTS

| | | |
|---|---|---|
| WO | WO 95/17783 | 6/1995 |
| WO | WO 99/34307 | 7/1999 |
| WO | WO 01/46834 | 6/2001 |
| WO | W/O 02/063498 | 8/2002 |
| WO | WO 02/063498 | 8/2002 |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

Burton F. W. et al: "Multiple Generation Text Files Using Overlaping Tree Structures", Computer Journal, Oxford University Press, Surrey, GB. vol. 28, No. 4 Aug. 1985, pp. 414-416.

* cited by examiner

FUNCTIONAL OPERATIONS FOR ACCESSING AND/OR BUILDING INTERLOCKING TREES DATASTORES TO ENABLE THEIR USE WITH APPLICATIONS SOFTWARE

BACKGROUND

While the functioning of the basic model for our interlocking trees datastore, which does not require indexing or tables to construct or use it has been described in our prior patent applications, there are valuable additional structures and processes that can be added to it. We often refer to our interlocking trees datastore as KStore (or sometimes just K, although we also refer to it as a KStore structure in some discussions). The previous patent applications describing KStore already on file in the U.S. are identifiable by Ser. Nos. 10/385,421, 10/666,382, and 10/759,466, all of which we incorporate by this reference in their respective entireties. We have found that in order to make the KStore structure more marketable and easier to use, several innovations have become important. We describe these in order to facilitate the interoperation of the structure with applications software and with users, and in general to make it easier to use. In doing so, the KStore, or KStores, become integrated into a system that is facile at handling data for nearly any desired use.

Being able to get data into and knowledge out of the KStore structure using common software interfaces will make the structure more viable as a commodity and more useful to the public, because it will enable them to access it with the tools they already have or are used to. With the demonstration of the components needed to facilitate the use of the KStore structure to the data within the structure, it will become apparent to one of ordinary skill how to apply those components to nearly any kind of application for its interaction with a KStore.

Up until now, the KStore was accessed by its engine with custom-built software. Being entirely novel, it was useful to those with the ability to build such software. Therefore, for any application, access needed to be redesigned and again, apparent to one of ordinary skill how to apply those components to nearly any kind of application for its interaction with a KStore.

Up until now, the KStore was accessed by its engine with custom-built software. Being entirely novel, it was useful to those with the ability to build such software. Therefore, for any application, access needed to be redesigned and again, custom built. A way to avoid custom builds for those processes of the K Engine that were constantly reused needed to be found to make KStore more commercially viable. If it could be found, all this custom building and rebuilding could be avoided for many, if not nearly all applications that either needed to build a KStore and provide query access to it. Likewise this could facilitate use of a KStore for those applications that simply needed to get query answers from it. We chose to provide a set of intermediary software entities and simple method steps to accomplish this. These intermediary processes or objects need to address the issues associated with variations and complexity of applications which need access to a KStore, including multiple and disparate input data sources, and types and formats of queries.

For example, if a data source uses ORACLE database structures and is directly attached to the KStore in any manner with only a direct intermediary constructed to handle the connection, or if the data comes in through a transactional RDBMS system across the Internet and is cloaked in HTML or XML, or if the data comes from a real time sensor array, or whatever format the data takes, the underlying structure of the KStore should not have to change to accommodate such input forms.

Accordingly, we feel that an intermediary that gains common usage and allows many to take advantage of the inherent value of KStores for any purpose would be essential to making KStore commercially viable.

Therefore, we created the processes to enable one of ordinary skill in the programming arts, access to a KStore, without having to understand the KStore applications Engine or the KStore structure. We generated a system by which such a programmer could build and/or access a KStore for any purpose.

Additionally we needed to allow for switching states between queries simply accessing the KStore, and queries that allow learning and therefore add to a KStore's structure. Numerous other innovations for putting intelligence into the interface between a KStore and its users are also described and claimed herein.

BRIEF DESCRIPTION OF THE DRAWINGS

FIG. 6B is the more specialized API Utility component useful in preferred embodiments for maintenance, initialization, and modification by users and applications.

SUMMARY OF THE INVENTION

Figure 1A:
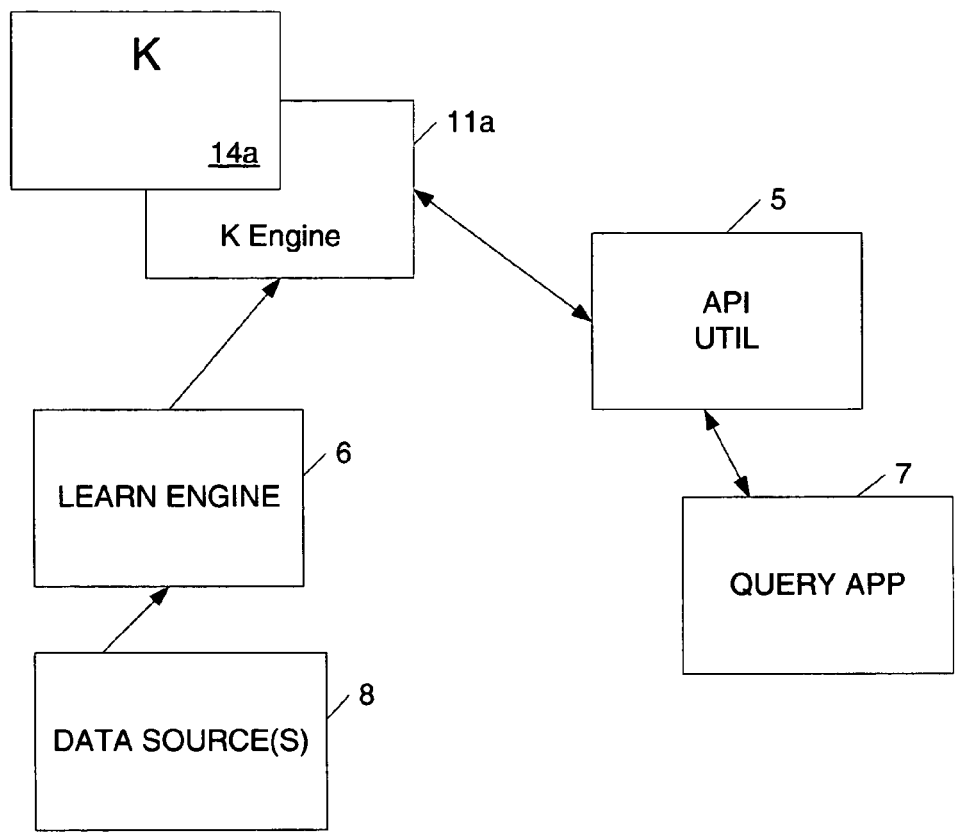
FIGS. 1A and 1B are block diagrams illustrating the interaction of the main components used in preferred embodiments of this invention.

In order to make the K Engine easy to work with, we have created a new set of objects (or system components) that provide services for learn and query threads so as to enable applications and interfaces of any kind to address, build and use the KStore. The objects we call a) a Learn Engine and b) an API (Application Programming Interface) Utility Engine. The Learn Engine object provides an ability to receive or get data in various forms from various sources and to turn it into particles that the K Engine can use. The API Utility object provides for appropriate processing of inquiries received by application software of any kind. Both of them work in very similar fashion, enabling threads to get information from and/or put information into a K. It will be understood by those of skill in the computer arts that objects can be constructed in software that will configure the computer system to run in a manner so as to effectuate the attributes of the objects. It is also understood that objects could be created in hardware as well as software so as to speed up their functioning.

A thread—sometimes called an execution context or a lightweight process—is a single sequential flow of control within a program. Each thread is generally a sequential flow of control within the same program. For background on this, see http://www.serpentine.com/~bos/os-faq/FAQ-1.html#Threads for a discussion on Threads and their history. Threads are defined as light weight processes. They can be thought of as the basic unit of CPU scheduling and a sequential execution stream within a process. A common definition of processes is that they have five fundamental parts; code, data, stack, file I/O and signal tables. This creates a significant amount of overhead when switching. Threads reduce overhead by sharing fundamental parts. By sharing, switching execution from one thread to another can happen much more frequently and efficiently.

Threads are an integral part of any operating system. However, three of the industry's leaders all have differing concepts about how to implement threads. In this application we use the term Thread to indicate a software process that handles either a Learn function or a query, from its initiation to its termination.

For convenient reference we generally describe the KStore data model structure here, although it can be found in more detail in the above-incorporated patent references. The interlocking trees datastore itself generally comprises a first tree that depends from a first root node and may include a plurality of branches. Each of the branches of the first tree ends in a leaf node which we now call an end product node. A second root of the same trees-based datastore is linked to each leaf node representing an end product. Finally, the trees-based datastore comprises a plurality of trees in which the root node of each of these trees can be described as an elemental node. The root node of each of these trees may be linked to one or more nodes in one or more branches of the first tree. The nodes of the trees-based datastore preferably contain only pointers to other nodes in the trees-based datastore instead of data per se, and may also contain additional fields wherein one such additional field may be a count field. Additionally, means to get probabilities of the coincidence of variables related to particular nodes as identified by desired contexts within one or more defined foci are known. Further, the application of logical operators to queries regarding such variables can be accomplished as described in the referenced documents.

The interlocking trees structure just described is constructed using a K Engine, which initializes and constructs the K data structure. The KStore when constructed is a model of a data set. The data set could be any input stream of data, static or dynamic. By using the K Engine with the objects for querying it and building it described herein, it is likely that nearly any application can access, build and use the interlocking trees datastore and structure.

The rules for building a KStore are simple. For each particle of data, check to see if the event of this particle following in sequence from the current location pointer (i.e., position pointer), is already a node in the structure, and if so, increase the strength of the event by adding to the counter in the node and its Result node, and reset the current position pointer to the new location. Otherwise, create a new node to record the event and reset the current pointer to the new node. Sequences may be started from a BOT event and are completed by an EOT event, (which can be triggered or indicated by a delimiting elemental, indicating an end of sentence such as a period, end of word such as a space particle, end of record such as a semicolon in some databases).

From the creation of sequences from particles, other levels of structure may be created depending on the universe being modeled. For the field/record universe for example, the first sequences of particles are recognized as variables in a sequence in a field. Completed field variable sequences are used to form record sequences in the same way that particles are used to create field variable sequences.

The rules for finding data are similar. For each particle of data, check to see if the event of this particle following in sequence from the current location pointer is already a node in the structure, and if so, reset the current position pointer to the new location. (This action of resetting the current position pointer to the new (next) location will make available a return of the address of this node). If not, process either an indication that an exact match was not found, or possibly reset the current position pointer to the location of a "next best" result.

For example, if you wanted a list of all A's in record 1449B2, the request would involve a call for the elemental root node for record 1449B2, from which one would obtain a list of all nodes that make up that record, and a call that would obtain a list of pointers to nodes for which the elemental A is a result. A comparison would then be made for matched addresses between the lists. The number of matched addresses would indicate how many A's there are in record 1449B2, and their location within the record.

The K Engine thus should be able to handle the threads which are initiated by a call, and facilitate the threads doing the various jobs of searching, searching with learning, searching in different ways, and learning, as well as have the ability to return error messages to the call initiators when that may be required.

Generally then, we have built ways to allow for connection by outside applications to query and build KStores.

Generally the components comprise a Learn Engine and a set of API Utilities. The Learn Engine allows for receipt of data from many types of input data sources and can be configured to particlize data in a manner suitable to the task to which the KStore being built by a user is to be put. Metadata about the particles is handled by the Learn Engine in a manner consistent with the user's intent for the KStore being built. For example, if a picture knowledge base is being constructed, and the user wants to be able to get image data in various formats, data about the format of an image being read and processed to be particlized and put into the KStore may be kept and passed as a particle or particles along with the image data. If the data being sent to the KStore is information from a field/record type database, particular field names may be kept, changed, or discarded, depending on the overall design of the KStore the user is trying to create. After particlizing the data as appropriate, the Learn Engine then makes appropriate calls to the K Engine and passes the data in particle form in a way that enables the K Engine to put it into the KStore structure.

The API Utilities facilitate inquiries of the KStore. They have to be able to receive inquiries and parse them into calls to the K Engine, to access K directly or to update associated memory. It may be preferred that a query not be an event the KStore is to record in its structure; in such cases a LEARN SWITCH should be turned off to prevent the query from causing an event or events from being recorded. (Note that for the field/record data universe this is generally so, but for Artificial Intelligence applications it would make sense to reverse the situation in that the LEARN SWITCH may be preferred to be "on" for queries, but possibly only "on" for learning/training. It also should be noted that switches per se may not be the best way to accommodate a change between learning and non learning activities related to the KStore). This could be done by setting up separate instances of the K Engine that are responsive to different types of thread activities, i.e., each testing for different settings. Thus one of these procedures would be responsive to a thread using a Learn Engine and would learn, and another might be from a query thread that learned, and yet another could be from a query thread that did not learn.

Figure 9:
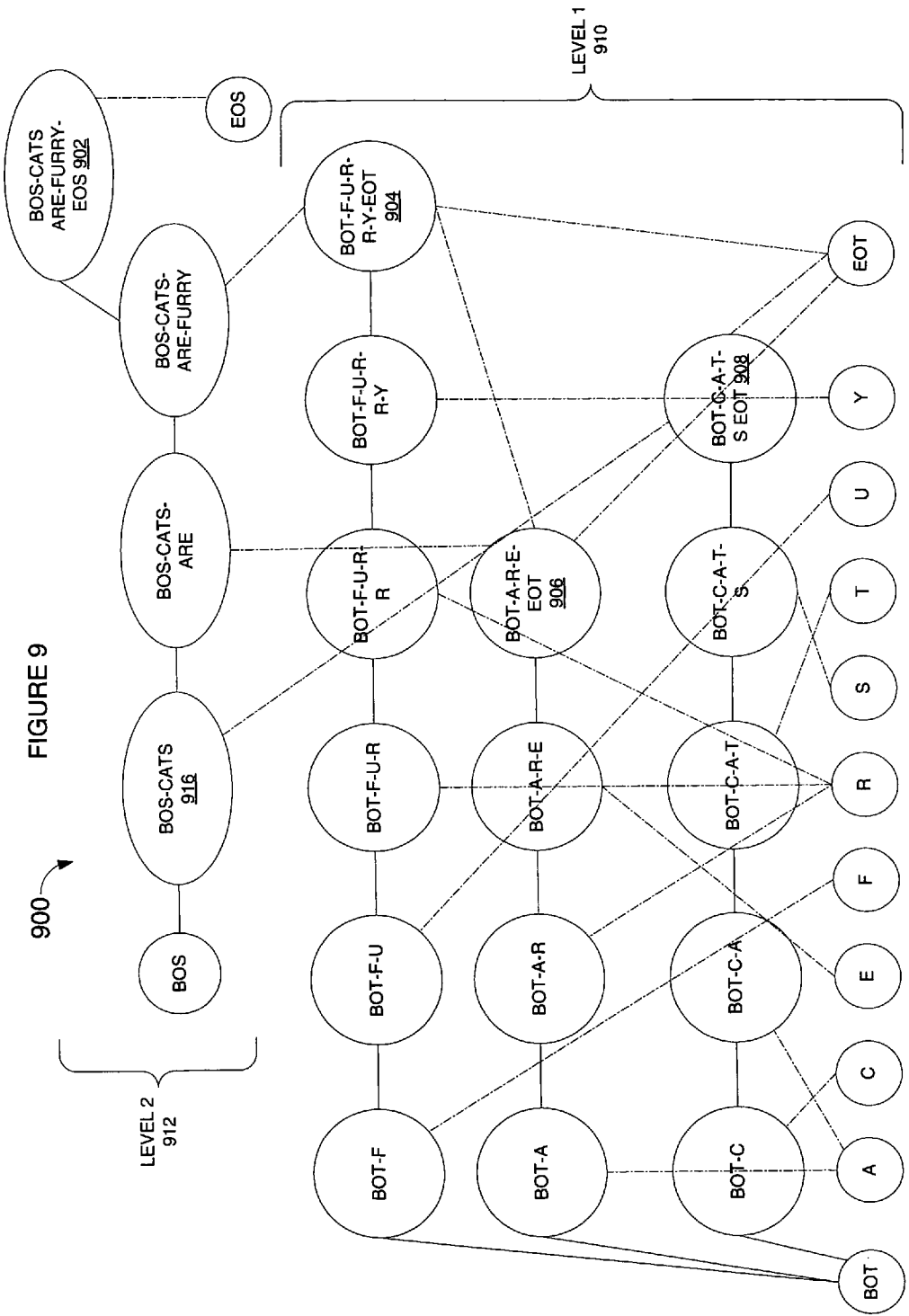
FIG. 9 is another block diagram of nodes in an interlocking trees datastore.

The API Utilities sometimes get information from the K using predefined pointers that are set up when the K is built (rather than particlizing and calling the KEngine). For instance, there is a field that points to the Record EOT sensor, the Field EOT sensor, and the Column EOT sensor as well as the Beginning Of Thought sensor. This field would be associated with the K Engine, and would allow it to traverse K using that pointer without requiring the API Utility to track this pointer information. (A "thought" as in BOThought or EOThought is a series of recorded event nodes. Thus, it is a chain of events, like a thought with a start (BOT) and a termination (EOT). To use the simplest to communicate example, using a thought as a series of perceptions via sensors, where these perceptions spell out C-A-T-S-<space>-A-R-E-<space>-F-U-R-R-Y-<period>, we have the potential for several EOT's if we use the <space>s as delimiters between thoughts (either setting an EOT at the end of the words CATS, ARE and FURRY, or at the space after each word>, and one EOT at the end (the <period>) to make the sentence a whole "thought." Thus, in this example we may have sensors for the letters C, A, T, S, F, U, R, Y, <space> and <period>. A BOT node starts the series of perceptions. Root nodes for C, A, T, S, R, E, F, U, Y, all have links made to this thought, with one link for the node represented by the C sensor, two links for the node represented by the A sensor, three for R, one for E, one for F, one for the U, and one for the Y. The delimiters such as blanks, bars, unprintable characters, semicolons and the like (as well as what can be created sensors such as EOT nodes). (In FIG. 9 these could be nodes 904, 906, and 908, which can also be called end product nodes). The period should probably have a sensor for it in the typical KStore, but may rather indicate the end of a "sentence," and thus cause the creation of an EOS (End Of Sentence) node (like node 902). When a period shows up as something other than at the end of a sentence however, the next sensor perceived input particle will be initiating a new BOT link, even though it is not the end of a sentence, and the KStore will have to grow fairly large to sort all this out if the period particle is set to end a sentence rather than just be perceived.) This discussion was put in to define BOT/EOT a little better than we have elsewhere in this application. In FIG. 9 we also have a second level defined (Sentences, using Beginning of Sentence (BOS) and End of Sentence (EOS) nodes). Each of the word nodes are linked to their EOT nodes in the previous level as are node 906 and node 908. Here the structure just discussed is laid out, but without any spaces or period delimiters in the node structure. When the KStore is set up it could be set up with delimiters as nodes, or not, as may be desired and in accordance with controls imposed (using for example, state variables) via the administrative API Utility as described elsewhere in this patent.

Figure 2:
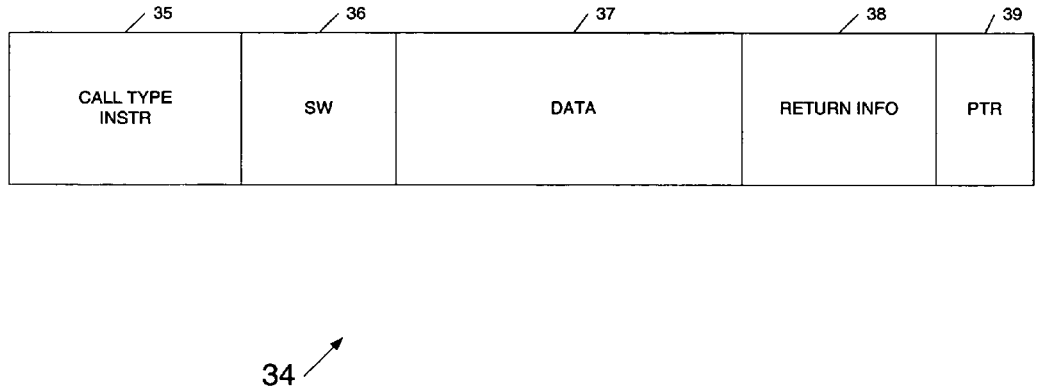
FIG. 2 is a block diagram of a message in instruction-word format.

It should also be noted with reference to this FIG. 9, the difference between a direct link and an indirect link. Current embodiments' K Engine will look for direct links when finding a location for a particle submitted to it. A message (like the message of FIG. 2) will have pointers associated with the particle identifying at least a last location within the KStore. The K Engine will have code that determines if the last location is linked to a one of the elemental root nodes through a next subcomponent node, (as found through reference to the asCase list of the last location node) and if so, this is considered a direct link. One of skill in these arts will understand this nomenclature well because the next subcomponent node could be the next in the thought. To see this, note the word thought CATS in FIG. 9, beginning with particle BOT-C and ending with the particle BOT-C-A-T-S-EOT, which in this KStore became node 908. If a last particle were BOT-C, and the next being submitted is BOT-C-A, in such event, the link determining part of the K Engine would note that BOT-C-A is linked to the elemental root node A, and thus find a place for the event of this particle in the KStore, establishing an existing location of said a next subcomponent node linked to the elemental root node of this particle as a new current location in the interlocking trees datastore, and returning this location to the source of the particle. The source of the particle would use this current location either to add to the next message data for the next particle it may be sending to learn, or to use as a part of the answer to the query it may be in the process of making. The elemental root nodes will, of course, all have corresponding entries on the sensor list kept by any of the K Engines that might address a particular KStore.

There are situations in which we would look for indirect links. The extent of indirectness that would be of interest would be dependent on what the user wishes to do. In such cases, if it is determined that the link from said last location to the elemental root node of said particle may be indirect, i.e., that the particle is linked through a subcomponent node other than said next subcomponent node in said interlocking trees datastore. To determine if there is an indirect link, we use an algorithm that, for example, will look forward on the aaCase list to other nodes beyond the next subcomponent node. Other processes can also be used, involving asCase lists of all the nodes in a thought, iterative processing through all the asResult lists, or all the pointers from relevant root or end of thought nodes, depending on what the user needs or wants in making such a determination.

Whether it is through a direct link, or through an indirect link (whichever condition the user sets through the relevant state variables of the K Engine), if that the section of K Engine code that determines whether the particle is linked determines that the last location is linked to a root node of this particular particle under consideration, then the location of the elemental root node of the particle is established as the new current location. In preferred embodiments we have a counter in the subcomponent node as well as one in the elemental root node and the subcomponent node of the particle which is incremented.

Additionally, if the last location is determined by the code in the K Engine not to be linked to an elemental root node through a next subcomponent (as determined by reference to the as Case list), then the K Engine will cause the formation of a new subcomponent node for the particle in the KStore. Also, if there is some indication that the particle the K Engine receives terminates a "thought" it will activate a routine to produce an end product node. Common delimiters such as periods at the ends of sentences, spaces between words, commas, semicolons and the like between fields in a record, black spaces between colors in images and the like are some ready examples any of which can act as delimiters, initiating the generation of an end product node when they appear because in such cases they are 'translated' into internal sensors. Thus if the process that determines that a particle is a termination of thought or EOT node, this process will preferably activate the formation an end product node in the KStore.

Also, the determination that a particle is a termination of thought can be structured to depend upon finding a delimiter, if the state variables for this K Engine/KStore combination are set that way. If so, and if the delimiter found in a particle is a delimiter for a higher level, this process in our preferred embodiments will add end of thought nodes for each level below the current level and add a new subcomponent node to the level above. Thus if a KStore is being built of words, sentences and paragraphs, and an EOS is reached, an EOW (end of word) and an EOS (end of sentence) are processed and the end product node of the sentence is used to create the next subcomponent node at the paragraph level.

It is useful at this point to briefly discuss how sensors are kept in preferred embodiments. While not typically broken out as separate code, a sensor list manager is found in our K Engine. Refer to FIG. 1B. The sensor list manager (not shown separately but part of K Engine 11) avails itself of the memory area 28a in order to keep each of the sensors in a list to compare incoming particles against. Thus, a routine of the sensor list manager will review each incoming particle against the list of sensors to determine if this incoming particle is a known sensor. If it finds that an incoming particle is a sensor on the sensor list, it finds a next subcomponent node linked to said sensor, by checking the asCase list, and then it can simply adjust the current location to the a next subcomponent node in the BOT/EOT chain. If there is no valid sensor found, a choice is presented.

At this point, we have at least three options for this choice, which can also be combined in various ways. First, we can have the K Engine ignore the particle and just wait for the next one, assuming it is noise. Second, the K Engine could create a new sensor corresponding to that particle and store that new sensor on the sensor list. Third, the K Engine can start a list of particles for which there are no extant sensors and send an error signal. For any of these three choices we can send or not send an error signal, and/or we can also keep a log of such occurrences. We can for any newly created sensors, mark them as newly created or created through error, or do any number of similar things to note the occurrence. For any of these choices we can also send a different kind of signal to cause a particular routine to manage or monitor this particle, this type of, or any configuration of a plurality of these types of, occurrence(s). If we have set up the K Engine to so cause or trigger the initiation or continuance of some routine outside the K Engine, we consider this type of set up to be an "internal" trigger because it is responsive to an internal occurrence. This nomenclature distinguishes it from "external" triggers which can be set up through an API Utility interface to periodically check the KStore for the existence of a particular condition or occurrence.

Also, monad lists may also be kept by a K Engine to keep track of signs at levels above the particle level. (Monads are also called end product nodes). In other words, preferably the K Engine can keep in its associated memory, a list of monads. Such lists will commonly be used if a user or program wants a list of which monads there are, but the list can be generated by queries of the KStore, so it is not needed to keep such lists. (It is also possible that in some embodiments it may be advantageous or efficient to allow the API Utility component or even Learn Engine component to have access to data about monads and/or sensors and the like. The API Utility sending a query or the Learn Engine sending a particle for incorporation into the KStore may use such access to the monad list or the sensor list, or to metadata about such lists, to avoid sending erroneous data types). In the CATS ARE FURRY example above, "CATS" and "ARE" and "FURRY" would be monads but not on the sensor list in preferred embodiments.

Preferred embodiments do not need monad lists at all but they can be beneficial in some circumstances, such as printing out a monad list if one is desired. The implication is that the K Engine checks the sensor list against the particles such as the letters in this example, but not the words (again, in this example). The other implication is that the information about the monads (such as, a list or table of words that can be retrieved using data associated with this KStore) can be retrieved from the memory associated to the component that keeps that monad list information. Thus any thread using that component (i.e., an API Utility or Learn Engine component) will have access to such data on the monads without having to look for them in the KStore. Assuming the component is an instance of the K Engine, any thread using that K Engine to access the KStore would have access to such data. Assuming the component is an instance of the an API Utility, any thread using that K Engine to access the KStore would have access to such data for finding perhaps more complex structures in KStore more quickly rather than having to find the particular monads of interest first before looking for the more complex structure or relations between various monads or monads and other nodes that may be of interest in a particular query.

Another thing should be mentioned about another possibly preferred embodiment handling of end product nodes or end of thought nodes. These end product nodes can be seen as root nodes for a next level in the interlocking trees datastore (KStore) structure. Accordingly, when they occur, they can be added to the sensor list, and larger particles can be fed to the KStore through the K Engine. This can easily be seen in FIG. 9 where the words can become sensors instead of letters, and if desirable in the given context, the sensor list can pave the way (using the features of this example) for acceptance of larger (word-sized instead of letter sized) particles. Having a large sensor list entails long search times for determining whether a particle corresponds to a sensor however, so the physical limits of the system in which this embodiment operates must be considered before adopting this approach.

A query will need to access the API Utility so that all the returned calls the API Utility makes to the K Engine will be handled appropriately and appropriately compiled into a useful result to send back as a response to the query. There are a number of ways to accomplish this handling of returned calls from the K Engine, and they vary with the nature of the query. In some, lists will be compiled and/or compared, in some items from a list will be found. The K Engine will return the current location pointer only, and the API Utility will use these returned sub component node or end product node pointers to access the KStore, using its read-only access to the KStore itself. These returned current location pointers will point to sub component nodes, which contain pointers to other nodes (i.e., an asCase list, as well as an asResult list). The returned location pointer will not point at elemental root nodes, which may contain actual values.

In preferred embodiments this is done through having a plurality of API Utility objects, each one associated with one or more functions against K. These functions against K are devices that operate to supply algorithmic processes which are used in finding solutions to queries or parts of queries, such as setting "constraint" and "focus." These functions can be called directly from an application or by a user. In some preferred embodiments, actual GUI or menu screens are created to facilitate the use of specific functions against K.

By employing these functions against K, API Utilities and GUIs and the like we make it relatively easy to use a KStore to provide application programs and users with the ability to add data from multiple sources in real-time and also have the data available for searching, analysis, or other uses, immediately.

The processes we describe herein, will be able to process static data from a standard file as well as more dynamic, real-time input. A standard input format could be one such as a file formatted in ".txt" or XML or any other format. This would be used with preconfigured conversion components. The process could also take custom formatted static and/or real-time data feeds. It should not matter what format the data is in if the input data format is known and can be converted to one that is universally used for the particular K under construction. Different instances of K could use different input formats and a single K could itself receive data from different input formats if desired. Furthermore, it is possible to simply allow the input data stream to be simply particlized without formatting and the KStore would eventually sort out what was what, but at the present time such an approach is impractical. The Knowledge base constructed from the data will be preferably viewable through one or multiple GUIs (Graphic User Interfaces, which could include sound, tactile or any form of interface) interfaces that in the preferred embodiment are managing the software application that is accessing the KStore. It is also worth mentioning that the input data need not be limited to data in digital form. Analog input (including various and sundry characteristics including but not limited to height of a signal, duration of a signal, strength of a signal) can be used as well, such as when analog sensor data is part of the input data stream, microphones are used to pick up sound and the output is not digitized, and various other potential sources of analog signal is tapped. In this digital age, it seems important to acknowledge that such input can be also used. One can choose to segment the analog signal into particles as one seems appropriate given the nature of the input and the expected use of the constructed KStore.

Generally, the data source can send the data into a KStore through a Learn Engine in real-time, or if desired, the Learn Engine can cause the KStore to accept static data and act as a data warehouse. In other words, data sets to be used can be read from persistent data storage systems (e.g., disk) or can be read as a continuous stream from one, or multiple sources in real-time.

In the real-time preferred embodiments, the software application is most probably running on a server, the various K views (GUIs) are web based, the data stream comes across the Internet (or a local network if desired) as it is generated in real time, and the KStore is dynamic. While we have created our own software applications product, it should be recognized that the locations of the elements of systems can be easily hosted on different computer systems and with different connections.

Thus, as data is read, the "KStore" or KnowledgeStore data structure is preferably constructed in a memory system of a computer. The KStore data structure that is created by nature of its structure, models the relationships between the variables in the data set. This KStore can be queried using the analytic GUIs or batch applications or the like to explore the relationships between the variables in the data set (i.e., perform data mining activities). The KStore can also be queried while the data is being read and the KStore constructed.

One way we can illustrate connecting the KStore to the outside world is through use of a Learn Engine. The Learn Engine calls the K Engine to accomplish its task of supporting threads to enable its function in the transporting of knowledge into the KStore. The threads are initiated by establishing communications with a data source. This can be done via a GUI or application software. For each call to the Learn Engine, after an acknowledge or with other protocol means, the Learn Engine sends a single "character" to the K Engine for processing. The K Engine thus constructs K to record a sequence of events. Discussion of how this positioning at the "point of attention" or "position pointer" and then adding structure if it is new was found first in U.S. patent application Ser. No. 10/385,421. This generally consists of checking to see if the event of this "character" following in sequence from the current location pointer is already a node in the structure, and if so increasing the strength of the event by adding to a counter in the node, and if not, creating a new node to record the event. Additionally, if the new node is created to record the event, and this new node is a new node at more than one level, additional nodes may have to be added to indicate that. For example an end of sentence node may also terminate a word, so a new end of sentence node and an end of word node might be added.

In order to show what we mean by connecting the KStore to a piece of applications software, we will describe how a query is handled using a particular kind of analytic, single variable prediction, a process we described in the Ser. No. 10/759,466 referenced above, by which a K Engine positions the point of attention, to locate information in the KStore. This requires deciding on the context (also called constraints) and focus and communicating that to the K Engine through the API Utility, and receiving the results. Thus, we also provide a basic GUI by which a user can exercise this query, and describe the component processes and elements by which this can occur in the realm of the KStore. See discussion below about Single Variable Prediction for further explanation of a preferred method for finding information in a K. Note also that if the K Engine can't find an exact match for the data requested, there are 2 possible responses. Currently, we consider this an error and do not change the location pointers and possibly a resulting "error" code. However, at some point we may indicate that we didn't get an exact match, but return the next "closest" result or a list of possible results. An example is a spell checker that doesn't find the word requested, but gives you possible alternative answers.

Because there are basically two processes that are appropriate for KStore data structures, we have created two additional Engines. One causes the KStore to be constructed, i.e., to learn, and the second causes the KStore to provide access to the knowledge. The first additional engine we call the Learn Engine and the second engine we call the API Utilities. It should be noted that the API Utilities may also cause construction and learning, where that construction and learning is about queries being made of the KStore, similarly to the way one recalls thinking about something; in other words by analogy, one can remember items that one has thought before just as the KStore can "remember" things it has been asked to recall. Details of how this functions will become clearer after reading the rest of this patent. Nevertheless, the API Utilities are generally used for queries to which application programs seek answers from the KStore.

The API Utilities also consist generally of support programs for threads. The threads are initiated by communications from a GUI or application software through which a query is presented. One program for supporting threads initiated by a query is an activatable process for calling the K Engine routines that position the point of attention within the KStore. If the call to the K Engine finds no KStore (or no position at the selected point of attention), the K Engine may in this case return an error signal (or a "null" call return indicating an error). Otherwise, assuming a constructed KStore, it returns the information indicated by the positional activity of the K Engine, i.e., the address of the node or nodes sought. Details of positioning the point of attention are described in U.S. patent application Ser. No. 10/666,382 entitled SYSTEM AND METHOD FOR STORING AND ACCESSING DATA IN AN INTERLOCKING TREES DATASTORE, mentioned and incorporated by reference above. This '382 application also describes how to evaluate the data in a KStore by determining a context and a focus, in other words, how to respond to a structured query about probabilities regarding the data represented by the nodes of the KStore. The evaluation process described therein are simply repeated exercises of the K Engine, each time finding points of attention (nodes) that are responsive to queries structured in accord with the evaluation processes used to find the context and focus.

In preferred embodiments, an interpreter which may be part of the API Utilities, uses constraints and foci to answer questions in the form they are asked by the application program or the user interface.

By "characters" we mean any "particle-ized" (hereinafter particlized) form that is something that is recognized as a sensor or elemental root node of the particular KStore that the K Engine is building. For example, if the lowest level piece of information this Kstore recognizes is an ASCII character, then the particle is in fact a character. The KStore may be building a record of words, or other character strings, and eventually sentences, paragraphs, books or the like. Or, it could be building a record of string variables in a field/record universe. In the field/record universe where we are certain that only particular variables will be found, we can use these variables (such as words or other string variables) as the variables or elemental root nodes. In such situations the K Engine accept any data as a particle, including sequences or similar input.

If the lowest level piece of information is a pixel, for another example, location within an image, color, and brightness may be attributes of the particle pixel, and the elemental root nodes would have such attributes as their characteristics, with each additional pixel being fed to the KStore by the K Engine having all such attributes but no more attributes, and each pixel would identify (or be identified with) a node in the KStore once placed into the structure. In this example, the "sensors" for a pixel would include image location, color and brightness, and the Learn Engine would have to feed the particles of information to the K Engine as units or sensors for each such attribute. There are other ways to construct this by clumping attributes together with other attributes and having "heavier" particles, but that is beyond this discussion and not preferred. If the system we are building considers "attributes" as themselves "sensors" that get connected to other "sensors," in the preferred embodiment K structures these would create an end product node that is actually a "pixel with certain attributes". (It is important to realize however the more general principle relative to this discussion that if a particle does not match a sensor for the K that is learning, that particle will be ignored, i.e., not produce a recording in the K structure. Thus a string of ones and zeroes that is longer than the bit length for ASCII characters will be ignored if there are only ASCII character set sensors for that K. It should be noted that we may in some embodiments keep the odd particles, pooling them or reviewing them and adding a new sensor if certain conditions prevail. For example, if numerous particles of an identical form are sent, a routine could establish a new, non-predetermined sensor to capture these in the KStore.)

Thus, particlizing is an attempt to break data down into a predetermined sensor set. The Learn Engine is functioning to break down what it receives from data sources into a set of sensors, and feeding that set of particles, seriatim to the K Engine. Sensors may be thought of as the smallest units of data that can be perceived by a K. Each K can be designed with its own unique set of sensors if desired, but in doing so, attention should be given to the data one is creating the K to accommodate. The ASCII character set is a common set that would have substantial commercial use as databases are likely first target markets for use of KStores. If a KStore were to be used in a robot, touch signals available through actuators, and the signals indicating movement of those actuators may be more useful sensors. If used to automate or track activities within a refinery, a KStore would preferably have sensors that picked up or noted signals indicating flow through pipes, tank levels, temperature at various locations, and the like.

Additionally, it should be mentioned that since we are describing both learning and querying, a mechanism is needed to turn off or on a "switch" putting the process into a learn (construct) mode or keeping it in a query mode. If in a query mode, with the learn mode switch on, each query may add additional nodes, or additional counts to the existing nodes in the KStore when the K Engine addresses existing nodes. Preferably this mechanism is in the Learn Engine, but could be addressed through other means as well. It could be that the Learn Engine and the API Utilities have different procedure calls to effect the operation of a switch-like function, or other means could be used as well.

Further, in some embodiments we allow for triggers to respond to conditions or events and generate output from the KStore to effect actions outside the KStore system. These can be internal or external triggers, responding to activity within KStore itself or responsive to periodic queries regarding the conditions or events, respectively. Internal triggers in preferred embodiments are enabled and disabled by the settings of switches for them. The settings for these trigger switches are preferably stored in the K Engine associated memory, but one of ordinary skill can find other locations for such storage.

DETAILED DESCRIPTION OF THE PREFERRED EMBODIMENTS

Figure 1B:
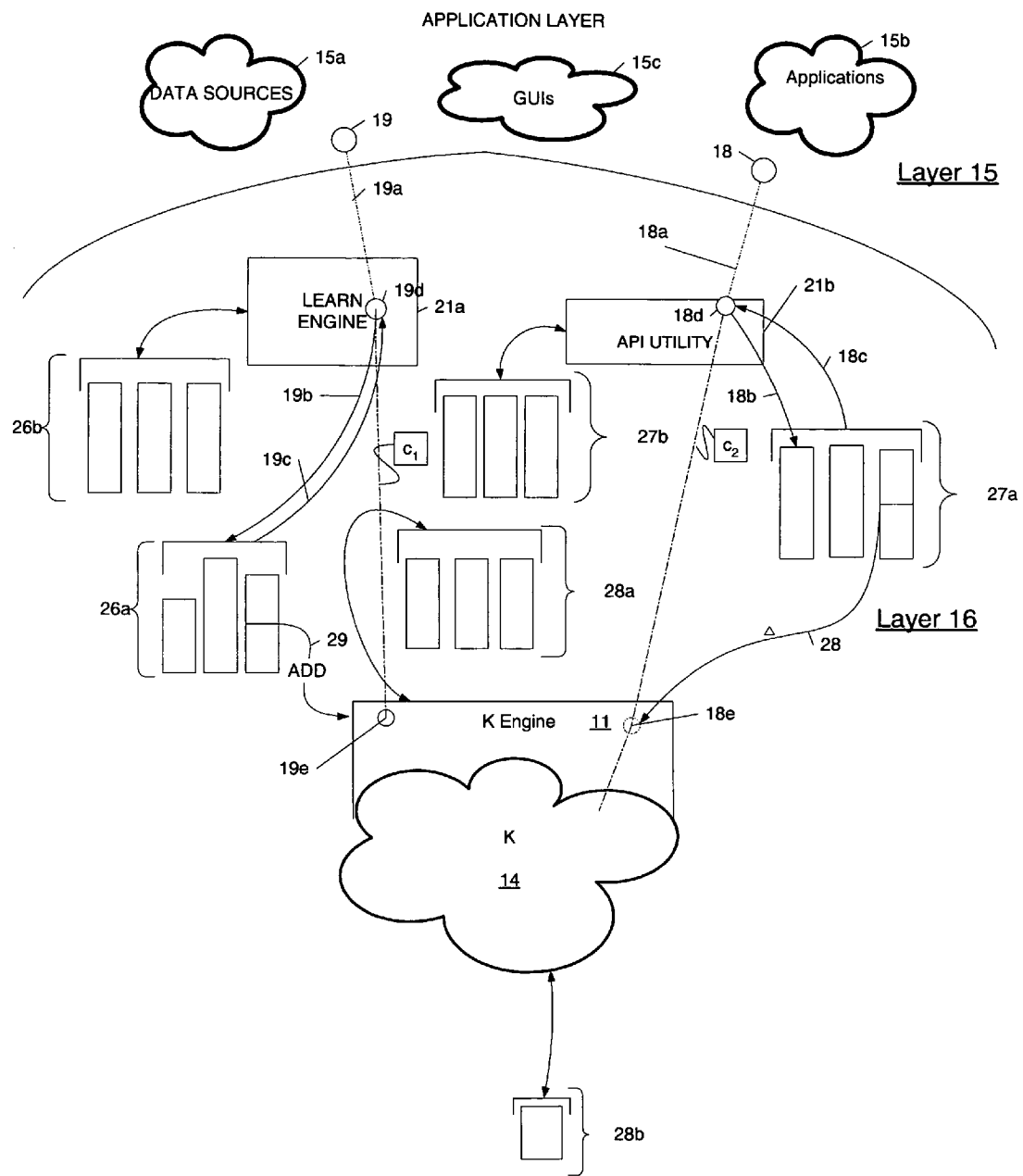

FIG. 1A illustrates a KStore 14a in a preferred embodiment environment in which a K Engine provides the only connection of the K 14a to the rest of the world. (It should also be noted that there can be more than one K Engine, similar to the one K Engine 11a in the illustration, providing access to the KStore 14a, as we will discuss in more detail within). In turn, the K Engine 11a is addressable by software entities such as API Utilities 5 and Learn Engines 6 which manage and handle threads in cooperation with the resources of a computer system (not shown) in which they operate. (Typically, the computer system will be a server although we have used a single Personal Computer in some implementations of K.)

The outside world, in our preferred arrangements has access to the K structure only through these API Utilities and Learn Engines. The API Utilities and Learn Engines, are accessed by the outside world through an applications layer. Software applications such as GUIs, databases, and any other type of program or interface which could provide data or request information can be hosted in this applications layer. FIG. 1A illustrates this same structure but is drawn to avoid the explicit delineation of threads and layers, to indicate to the reader that the hosting environment is inherently flexible in its nature.

Specifically, in FIG. 1B we have illustrated a KStore "K" 14, as a cloud, situate in a computer memory system (not shown). This "K" 14 is accessible by a K Engine 11. (There could be multiple K Engines. This is mentioned in some further detail below). An applications software layer 15 may contain various forms of GUI (Graphic User Interface) interfaces 15c for users to send and receive data such as queries and replies. This layer 15 may also contain Data sources 15a, or programs (which can be in or associated with data sources) of cloud 15a, which provide data to build KStore K 14. Also this layer 15 can contain application programs 15b which applications programs may make queries or provide data to be related to K. None of these layer 15 structures are shown in this diagram that only identifies the major features of this invention in a preferred form. Additionally, it should be noted that maintenance and administrative functions can also be performed either through applications or GUI's. These administrative and maintenance functions (described later) can be used for configuring the KStore and/or Learn Engine, and API Utilities. The components of a layer 15 can be spread across the internet, with parts of GUIs and applications hosted among various computer systems and networks if desired, or it can all be local to the same computer system server which hosts K and the K Engine, as well as the component Learn Engine and/or API Utilities. Another related illustration is in FIG. 7 discussed in more detail below.

In FIG. 1B, layer 16 is a layer that contains at least one instance of API Utilities and/or a Learn Engine 21b/21a. We can simply call an interface object since for the features shown in this diagram, it functions similarly for both types of interface objects. This object contains or is the set of programs that enable calls for information or data input 19, 18, to address K regardless of the form they are in. Calls to this object Learn Engine 21b or API Utility 21a, initiates a thread, threads 19a or thread 18a, respectively. This thread may supply a continuous or a discontinuous stream of data to the Learn Engine or contain the parameters of a query for the API Utilities. The programs in the software object 21 set up a data storage area 26, 27 in memory (preferably on the server, thus in layer 16) to accommodate the processing needs of the thread 19a, 18a, respectively. The threads are given "cookies" or keys C1, and C2, respectively, which enable them to access the memory areas. Such access of thread-controlled memory areas is accomplished using reentrant code of the software object 21a/21b which has routines 19d, and 18d, respectively. These routines will enable passing address, pointer or other particle-related data to the thread into or out of the data storage areas 26, 27 as the thread executes. Thus, in the case of the Learn Engine, pointer addresses indicating where in a sequence the location pointer is currently for this thread, a list of pointers to all sets of relevant nodes, and information of that nature are stored and accessed from the memory areas 26 or 27 as the need arises. The data in memory areas 26 and 27 are thus used to drive the activity of the K Engine 11, in that they help the K Engine construct an action to place a new event or find an existing event within K. Based on the result of the activity of the K Engine, the API Utility routines may add data (using reentrant code 19e to update the data 29 in data storage area 26, or change some data already in the data storage area 27 (using reentrant code 18e with the changes in the data 28)). In other words, we are passing the address of the data storage area around, so we can update the data directly. That's not to say that one could not have a separate piece of code associated with such data transfers/modifications whose sole job is to manage the storage area.

Generally then, the threads are created by the appearance of new data being sent to a Learn Engine or a query asking for results from an API Utility handling such requests. In the case of the Learn Engine 21a, managing this thread creation requires the allocation or establishment of memory resources 26a and keys or cookies C1 so that the thread will have access to these established memory resources. In the case of the API Utility 21b, it will also establish the memory resources 27a and keys or cookies C2 to manage the query thread and to guide its operation between the K structure 14 and the K Engine 11. The K Engine will handle the events in the realm of K 14, producing a current location pointer, which can be used by the API Utility to traverse KStore and answer the relevant query or part of query the thread is working on. One of ordinary skill in the programming arts is familiar with the concept of threads and how to have various objects create them in a computer system responsive to program-generated signals and/or data messages and the like, so no further discussion about how to accomplish this using threads is required. Likewise, it will be readily understood by those of ordinary skill in the programming arts that such a set of processes can be created in nearly any modern programming language without any difficulty, and that there are numerous ways to do so.

These memory resources 26a and 27a allocated to threads 19a and 18a, respectively, provide places that the Learn Engine and the API Utility can buffer and manage intermediate processing. Such intermediate processing may be needed to satisfy the function of the Learn Engine and the API Utility in supporting the activities of the threads. In the Learn Engine, memory area 26a would be used to hold data being particlized as a buffer while the Learn Engine functions to separate and manage each particle as needed. The memory area would also provide space to maintain pointer lists for determining which particle is being sent to the K Engine currently, and the relationship, structure-wise of this event to the data stream being input from the data source. Lines 19b and 19c indicate a path between the thread's reentrant code segment 19d and the memory area 26a which controls the particlizing process, allocating particles and any other needed parts (if any) of the incoming data stream to the memory area. Line 29 facilitates the entry of the Learn Engine's particle data as a part of the message carried to the K Engine by the thread 19a, at section 19e, In here, the K Engine 11 processes the recording of the event in K 14 and returns the current location pointer to the Learn Engine. (Thus, in the drawing, thread 19a may not continue into K itself, unlike thread 18a, which in some circumstances described below can, without going through the K Engine).

The API Utility-related thread 18a would use its memory area 27a to enable the same kinds of functions in a similar manner, supporting thread 18a's activities in making a query, using the resources of the API Utility 21b. Again, a key or cookie (C2) would preferably be provided for the thread to manage its access to the memory area 27a. Again pointer data and data related to the thread's activity, in this case an inquiry of K, are stored in area 27a while the processing of the thread is unfolding. Here, data is returned, in the form of memory location pointers or addresses along line 28 from a piece of reentrant code 18e that the API Utility routine operates with. The management of the memory area, which can be quite complex for a complex query, is handled through reentrant code 18d and communications pathways or messages 18b and 18c.

Note too that in preferred embodiments additional memory areas are allocated for the K engine (area 28a) and for the KStore (K 14) itself (area 28b). Use of such memory areas are preferable to support functions such as switches to determine the various states and conditions for the K Engine and the K structure itself as the API Utility routines determine how to respond to queries or additional data input, whether to learn it or not, and for various features that might be program controlled. For one example, if we have two K Engines, both accessing a single K, the memory area 28b would be used to lock K so that it could learn a new event. For the time K is locked, only the K Engine having access to it (or the part of it that may be locked) could alter that K (or that area of K). Memory area 28a would be needed to store information related to the abilities or configuration of the particular K Engine that uses it. As the reader becomes familiar with use of K and K Engines, additional particular uses for such memory areas may become apparent, but at base, it is most useful to have a dedicated memory region to store each K's state and the state of any universal property switches that may be in use, and a dedicated memory region for each K Engine's state and the states of any properties that will be used by any set of threads.

Generally, the threads will produce calls from the API Utility and the Learn Engine to the K Engine to effect the learning or the query. The K engine processes 'particles' and returns the current location of the K location pointer to the caller. If the 'particle' sent is recognized as a sensor, the K engine will try to record the event by moving from the current location of the K pointer to a location on K that has recorded this event before. If there is no past record of an event equivalent to this, new K structure will be created to record the new event. If the 'particle' sent does not match a sensor the current K pointer stays the same. In a preferred embodiment, the K Engine will ignore the event as 'noise' and the calling routine will have to decide how to process this event. However, at some point the K Engine might "decide" based on a switch setting to send an error message or to create a new sensor, or perform some other task, whether it be communication to another component or sending an Email or modifying its activities with respect to K. Switches or modified K Engines can enable endless such activities, as the imagination of one of ordinary skill in these arts can easily conceive.

It should be noted that switches can powerfully affect the K Engine performance and allow for control over its configuration. Specific switches we have used include at least one for Learn (Y or N), Column numbers (Y or N), Meta Data field names used instead of column numbers (Y or N), EOT levels (Number and names), EOTCOL (column name), EOTVAR (variable), EOTFLD (field entry), EOTRCD (record). One of ordinary skill in these arts will recognize that this list is far from exhaustive and that different switches will be created for different uses for the KStore. For example, a host of switches may be set up for a KStore that stores images, relating to pixel information.

Calls themselves, that is, the requests from the Learn Engine and API Utility objects can be very simple statements or even instruction words. The quickest way to see this is to illustrate it as an instruction word or message 34 of FIG. 2. As such (we use the concept of the instruction word for purposes of a teaching illustration) the instruction word could have an instruction type (Call) 35, but in most embodiments this is not needed because the K Engine will return a current location pointer regardless of the purpose of the call. The message will preferably have a switch component 36, but in many embodiments, switches can be set for the K Engine elsewhere. The message does require a data particle 37, suitable to be brought in to relation within the KStore. By this suitability we mean that the particle must be something the particular KStore can recognize. In other words, if the KStore is only able to understand ASCII text particles and the information in the data particle section 37 of the example data word 34 is not an ASCII character, there will be an inability on the part of the instance of the call handler spawned to learn this particle to accomplish its task, and the call handler should generate an error signal to return to the Learn Engine in such an instance. Likewise, if the API Utility sends a request to find a particle in said ASCII-based KStore that is not in ASCII, an error indicating something like "not found" would preferably issue, responsive to such a request. (A further discussion of particles qua particles, characters, pixels, or other signs is found elsewhere within this document). Still using the instruction word analogy, the message to the K Engine should also have a return address section 38 that indicates the source of the request. This will preferably be generated by the Learn Engine to indicate that the acknowledge or error signal should be returned to it (along with some kind of trace so it knows which particle in a particle stream caused the error). If the call came from an API Utility, the return address section would be used to track where the API Utility got its query from (i.e., from which thread and where among the parts to this thread this call came) and to which this call is a part of the solution. (By part we mean that it may be a focus particle or a constraint particle to be used together to solve the query, or part of some larger query requiring several constraints or foci.) Finally, we should have a pointer 39 included in the instruction word 34. This pointer 39 communicates the current location in the KStore. The first particle in any new KStore will have a null pointer. This null pointer will be interpreted by the K Engine as a call to initialize, .i.e., set the current location counter to the BOT node.

Also, it is useful to have the option to include a switch area in the message, to let the K Engine know whether it can create new nodes if this particle is a new event, or if the particle is just for "looking up" some information in K. There are many ways to handle turning on and off learning, but this is one fruitful method. One can have a K Store structure that is always learning, as well as ones that are pre-built and only respond to queries without learning if desired.

Additionally, it should be noted that it may be necessary to allocate additional memory resources for handling the activities of these threads 18a and 19a (illustrated in FIG. 1B).

Thus, the basic components of a functioning system for supporting uses of a KStore are described, and from these, numerous things can be accomplished. However, details of the API Utilities that make them more useful as well as the details of the Learn Engine need further description.

Learn Engines.

The Learn Engine basically provides an interface and translation and particlization functions to enable the K Engine to receive particlized data to learn. Thus it must be able to process appropriate protocol, transport, and translation capabilities to receive input from the expected data sources, whether they are XML, Oracle, DBMS or whatever, whether they are from static or streaming sources or even external event-triggered real-time sensor sources. Of course the particular embodiment may be geared to any subset of such inputs. It needs also to be able to translate the data from such sources into appropriate sized chunks of data that can be readily particlized to fit with the expected data particle formatting of the KStore, and it should have a particlizer to send such particles to the K Engine, and any buffering as appropriate may be added.

Figure 3:
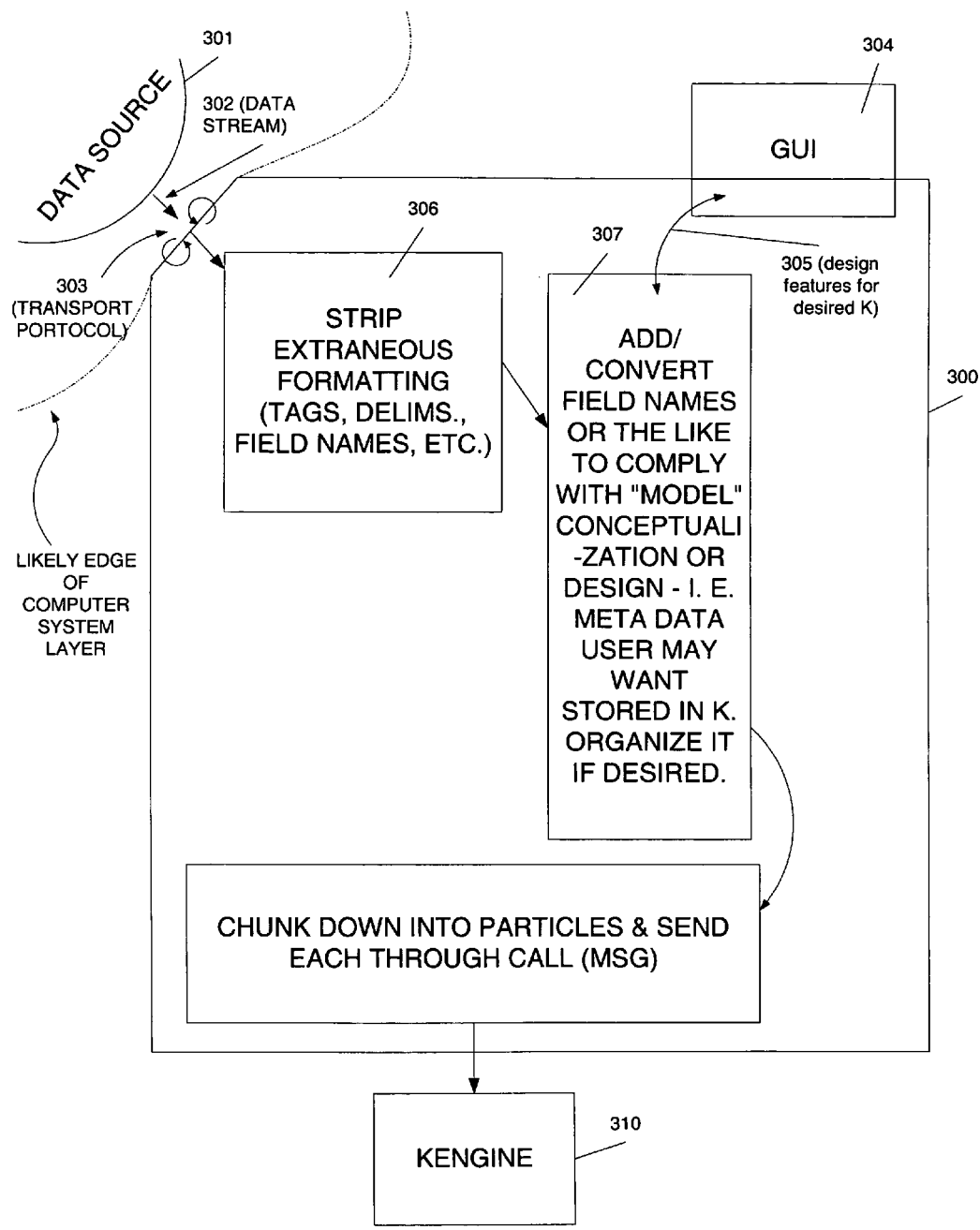
FIG. 3 is a block diagram of Learn Engine in accord with a preferred embodiment.

Refer now to FIG. 3 in which a preferred embodiment of a Learn Engine 300 is illustrated, handling a stream of data 302 from a data source 301. The data stream is received through a transport mechanism with associated protocol, in most cases probably from an external source computer system (not shown), across a communications medium (not shown) such as the internet or a local network to the computer system (also not shown) in which the Learn Engine 300 and the K Engine 310 as well as the KStore data structure (not shown), are functioning.

In a component 306, the Learn Engine will first remove any extraneous formatting and protocol artifacts, and any tags, delimiters, and field names that are not relevant to the KStore being built with the data from the data stream 302.

Subsequently, the incoming data will be subject in component 307 to a review of all Meta data about it that exists within the stream. In the case of the field record data stream of a preferred embodiment, fields that the user desires to keep identified will keep their associated metadata in a positional relationship to the data within them that the user has come to expect or want for this KStore. If a field name from a previous data stream that is going to be associated in the KStore with this new data stream came from a different database with different field names, the names may be changed at this stage in this component 307. Likewise, if a different kind of database was used in the creation of the KStore using the earlier data stream, the field name may come after rather than before the data in the other database, for example, so this arrangement should be mimicked at this component in order to regularize the data. There are alternatives such as creating a related structure within the same KStore by ignoring the differences, but it seems at this point to be efficacious to regularize the data streams, or, in other words, clean the data. Control over this data cleaning or regularization will preferably be obtained through a GUI 304, wherein design features that are desired 305 are conveyed to the component 307.

Next, a final component 308 in the Learn Engine need only break the data into particles with appropriate pointers indicating what kind of particle it is, and to pass this particle itself, together with the other message features i.e. the current location pointer, needed to the K Engine 310 in the form of a call.

As should be apparent by this point, and well understood by readers in these fields of endeavor, each of these functions and components can be distributed across the computer systems and networks as desirable to effect the most useful form for the particular application the user may be building or use to which the KStore will be put.

Figure 4:
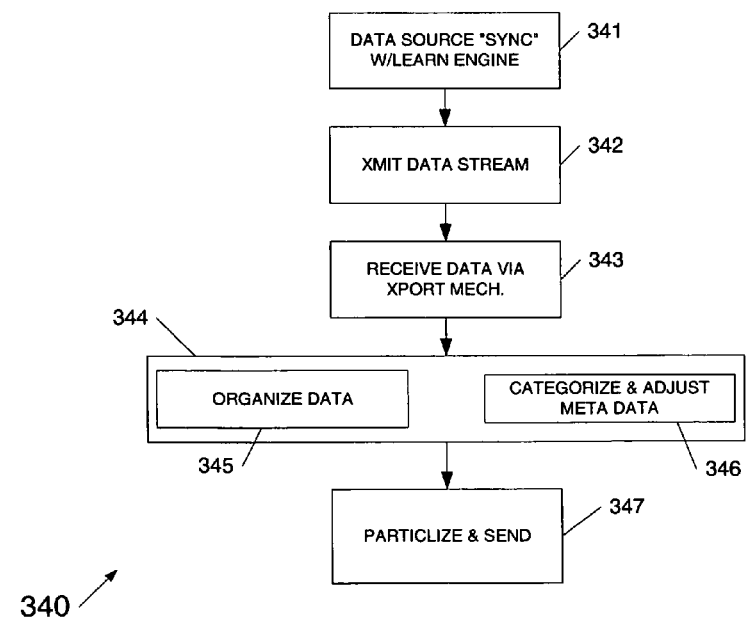
FIG. 4 is a flow chart of a typical process by which a Learn Engine of a preferred embodiment operates to prepare to pass data to a K Engine.

Referring to FIG. 4, the generalized process 340 by which the Learn Engine functions is illustrated in flow chart form. First the data source is synchronized 341 with the Learn Engine. Various protocol functions, establishing a transport mechanism, security features and the like are handled during this phase. As should be well understood by those of skill in the programming arts, one would prefer to have a mechanism for establishing the protocol for communications between the data source and the Learn Engine to allow the communications between the Learn engine and the data source to occur smoothly. Such a subcomponent would have signaling functions that would be established so that the data could flow into the Learn Engine from the data source, preferably without interruption. Once protocol for synchronization of communications is established, the data can be transmitted in a data stream 342. At this point the data can be received 343 through the established transport mechanism. It is at this point that the Learn Engine's functions relating to establishing appropriate data messages for the K Engine occur in step 344. In this phase 344, the data is organized into the format that the K will learn it 345, and the metadata as well as delimiters and other protocol or metadata features will be adjusted as needed 346. At this point the data stream is ready for particlization 347. It should be noted that delimiters and other metadata such as field headers or record number indicators ordinarily will be particlized as well for the field/record universe of data streams. This permits knowledge of the structure of the original data to be learned along with the data. Such particlization in this form is preferred but not required. Generally it will be understood that the data storage of the server system will be used to hold the incoming data stream as it is handled and/or reorganized for particlization by the Learn Engine.

It may be noted that in order to efficiently process new particles, particularly for establishing tables, where there are branches from particular nodes, the Learn Engine may submit location pointers for a previous to last position as the last position when it is creating a next message for the call with the next particle. To see this, look at FIG. 8. At the node labeled Bill Monday, there are two subcomponent nodes which follow it, using Bill Monday as Case definitions. They append either 103 or 100 nodes. This is called a branch. If the Learn Engine knows it is going to have such a branch, it may save the location pointer to the Bill Monday node and re-supplies it when it is supplying the second of the nodes 103 or 100.

To be clear about particlization refer to FIG. 9. Note that in this K, it starts at a level of letters, and shows a second level of words. If all letters are "sensors" that is, they can be recognized as particles, adding each new letter allows for continued growth of the K. Submission by a data source of the three words in order, "CATS" "ARE" "FURRY". This K accepts letters as particles. Accordingly, the API Utility interfacing to the Learn Engine for it must produce letters as particles. A first particle (or the "node" for the particle) is "C" located by a pointer saying that it is a first particle in a Beginning of Thought (i.e., this starts out as an initial new thought, at a node called BOT and its first particle is C (assuming it was started with a BOT particle or node). The next particle will be A, and it will be accompanied by a pointer to the preceding C. (Such particles can also be called "subcomponent nodes" as they are subcomponents of the "complete thought" "CAT" in the KStore which is an interlocking trees datastore composed of nodes). The K Engine will go through the asCase list and for each of the subcomponent nodes on the asCase list and for each node it will look at the result node to see if it matches and use that subcomponent to reset the current location pointer. In this case it will not have found a match so the K Engine will record this event as BOT C-A, a new subcomponent node, and put this new subcomponent node on the asCase list of the original location counter. The new subcomponent's address will then be set as the new current location. More precisely, The K Engine will see that there are no occurrences of A following C in the current structure and that a new node will be required to record this particle event as BOT C-A. The next particle will be a T, and the record will be BOT C-A-T. Thus it should be clear that for this particular K, the particles will be letters.

In our preferred embodiment Learn Engines, we generally will reduce the size of datums in the input data stream after stripping and adding and/or converting in order to comply with predetermined sensor information, that is available to the Learn Engine through the initial set up processes. The Learn Engine should be established with a set of switches kept in its associated memory area and accessible to a user or programmer that sets up the Learn Engine's functioning with the KStore and the K Engine it will be working with. These switches will have data regarding the datum sizes that are to be expected from the data sources it will be working with. This can also be handled in the protocol establishing step. In any event, the purpose of such activity is to end up with the size of the particle matched to said predetermined sensor information that the K Engine and the KStore it is working with will accept.

API Utilities

Figure 5:
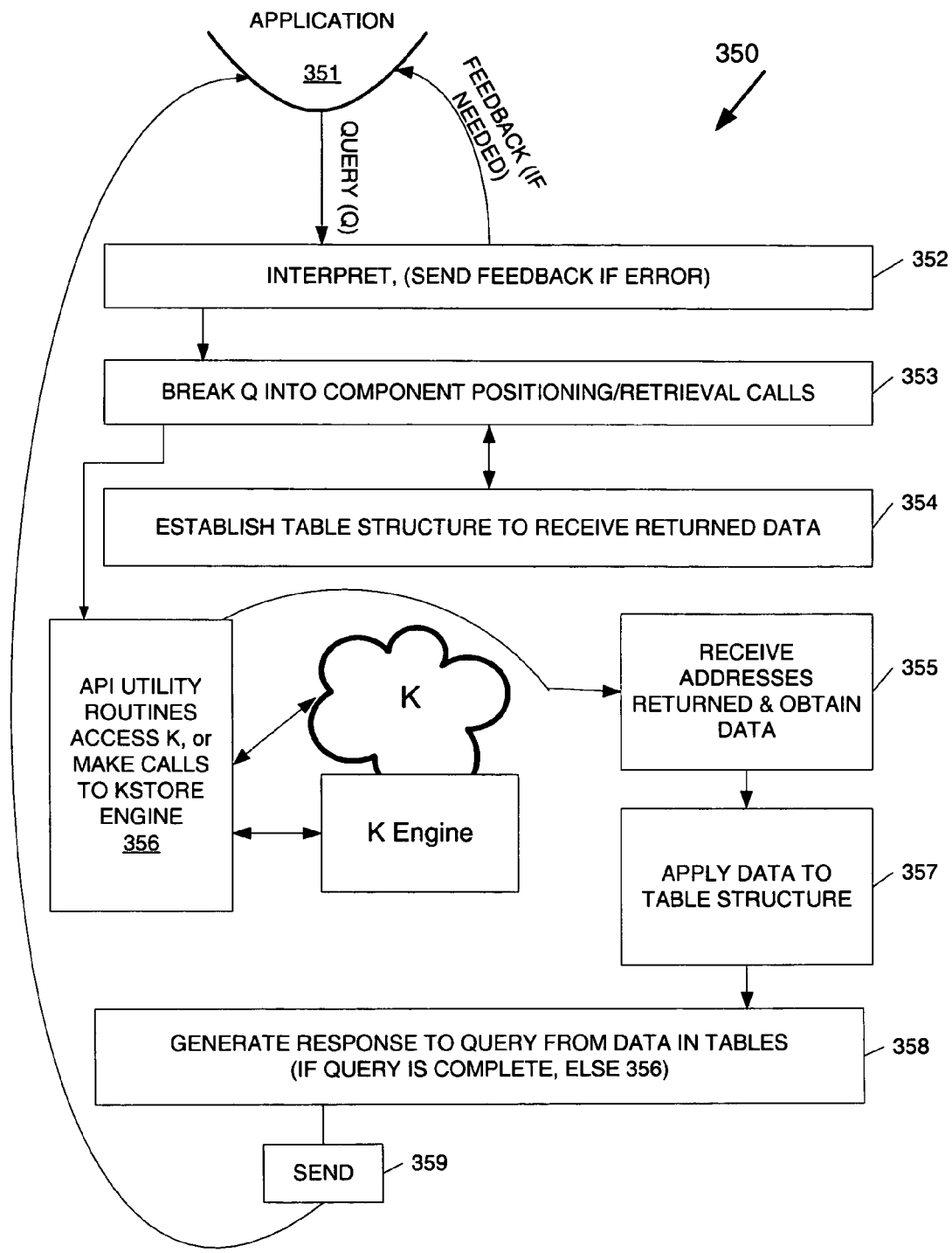
FIG. 5 is a flow chart of an application query handling process of an API Utility in accord with a preferred embodiment of the invention.

The functioning of the API Utilities is a bit more complex than the function of the Learn Engine. Refer first to FIG. 5 in which the generalized process 350 for handling queries is illustrated as a flow chart. The application 351 (or a GUI being accessed by a user) provides a query Q formulated to seek a result. This query Q could be in SQL format or any other format that can be parsed, such as for example natural language. An example might be "Was anything sold by Bill in PA?" (The query assumes that it is asking as of this moment in the K we are questioning.)

Figure 8:
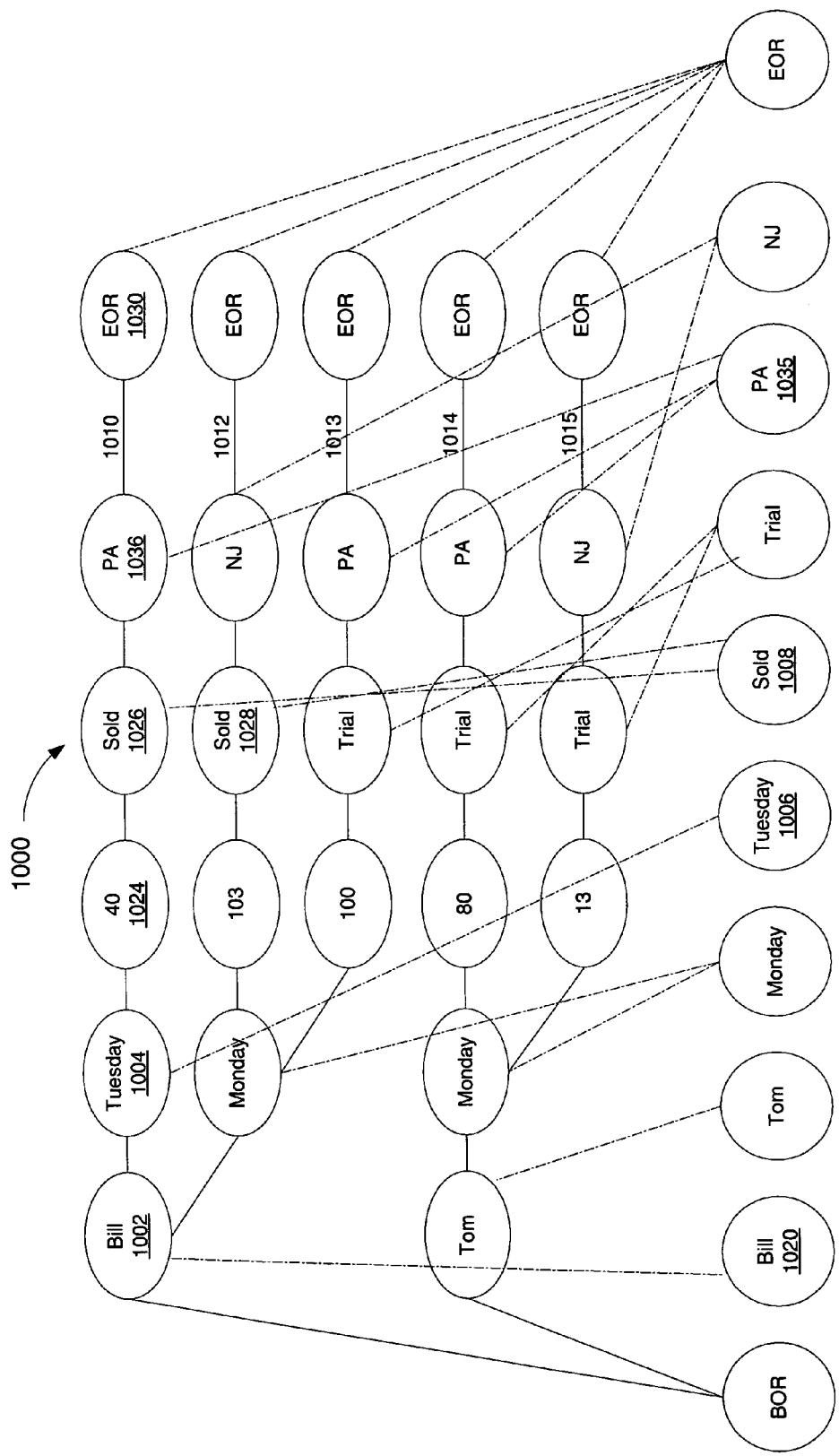
FIG. 8 is a block diagram of nodes in an interlocking trees datastore (KStore) useful for illustration example purposes.

Refer to FIG. 8 for a view of a small K structure in which this query could be asked. Here we would see that a "sold" elemental root node 1008 points to a node 1026 that is in a record also pointed to by an elemental root node "Bill" 1020, (i.e., node 1002), that is in a same record with a node 1036 also pointed to by the elemental root node for PA 1035. Thus having found all the elements of the query, we could return a "Yes" in response to such a query.

If the query Q is not understood or otherwise erroneous, a feedback mechanism may be provided to ask the application or the user to reformulate the query.

Thus, the next step we will take in the preferred embodiments will be to have the applications layer software interpret 352 of FIG. 5, and provide feedback or error signals if required. Once the query is established, the components of the query need to be established. For the question just asked, "Was anything sold by Bill in PA?" we need to find all the records in the K of FIG. 8 that have Bill in them, and focus on ones that have sold in them as well as having PA in them. If there are any such records, a positive reply is in order; otherwise, a negative reply is in order. In FIG. 8 there are three records with Bill, one for Tuesday and two for Monday. Thus the first part of the query would seek all records with Bill in them, getting the addresses from the pointer from the elemental root node for Bill 1020, and establishing them in the memory of the API Utility, and then complete the context by getting all the pointers to the records for Bill. The next part of the query would check for the pointers from the elemental root node sold, that also were pointed to by pointers collected for all the pointers to the records pointed to by the elemental root node Bill. Of these, the pointers to the elemental root node PA would be checked to see if any of them pointed into the records already narrowed down in the preceding steps. This result, if not the null set would indicate a positive reply.

These proceedings above comprise the breaking down of the query into component positioning and retrieval calls 353. At the base level the query is broken down into calls to 356 the K Store Engine, which finds its way into the K via current the location pointer, or if it is null, it is set to the BOT. Finding them to be present or not, along with any pointers to addresses that may contain lists of pointers if the node sought is a subcomponent node, end product (or end of record) node, or BOT node, it returns this information to the API Utility, which organizes the information and makes additional queries until the query Q is satisfied. The API Utility may go directly to addresses in the computer system memory to retrieve information consisting of other addresses or root node data in process 355. The API Utility applies the result to a table structure 357 that it creates 354 to handle the information retrieved. When the response is completed, it is formatted 358 to send as a reply in the query language used, but until it is complete, the API Utility continues to make calls to the K Store Engine. When the query is completed, the formatted response can be sent 359 back to the application.

Queries.

There is an infinite range of queries available, but we will start with a description of some basic ones for example purposes, and, for ease of illustration and understanding, use a K with its data tabularized. The data set consists of 15 records, composed of 5 fields. In this illustration each field has 2 possible values. These example records are:

Bill Tuesday 100 sold PA
Bill Tuesday 100 sold PA
Bill Tuesday 100 sold PA
Bill Tuesday 100 sold PA
Bill Tuesday 100 sold PA
Bill Tuesday 100 sold PA
Bill Monday 103 sold NJ
Bill Monday 100 trial PA
Bill Monday 100 trial PA
Bill Monday 100 trial PA
Tom Monday 100 sold PA
Tom Monday 100 sold PA
Tom Monday 103 trial NJ
Tom Monday 103 trial NJ
Tom Monday 103 trial NJ Thus the two variables for the first field are Tom, Bill; for the second, Tuesday, Monday, et cetera. The data above, if particlized through a Learn Engine and used to build a KStore, would produce a KStore similar to the one in FIG. 11, and the API Utility would permit processing of it.

A simple query would be to find or calculate the probability of a focus variable in a data set and could be accomplished by an application calling the API Utility first to return the number of occurrences of the subject variable and then the total number of records. The query could be processed by a background application or a GUI application. (If this processing were to be built into a GUI, drop down boxes could, of course, be supplied for selection of the Constraint variables and the focus variable from a single drop down box. A drop down box is a common term, descriptive of a view on a display screen of a list of items. Only the selected item is shown in the Figure). The query could be processed by a background application or a GUI application.

Figure 11:
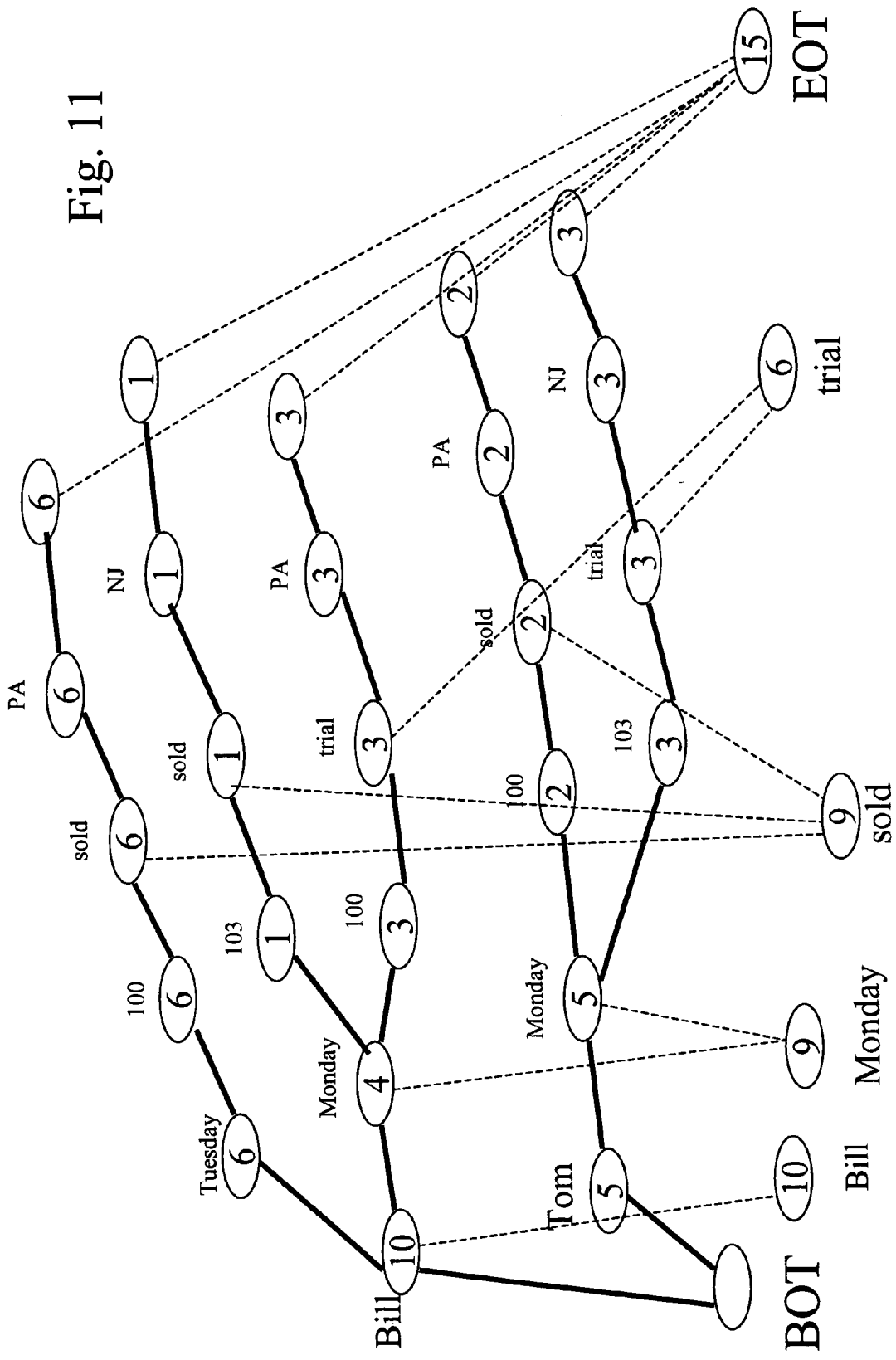
FIG. 11 is another block diagram of nodes in an interlocking trees datastore.

This operation can be seen easily in FIG. 11 which imports the records in the chart above into a diagram representative of a KStore. (The actual KStore will be in a memory of a computer system and the links will all be pointers, and the nodes will not contain any data or strings, the strings are shown over the nodes to make the KStore perceptible to the reader.) Here the counter data is shown in each node oval. Thus if we were constrained to find the number of Bill records for Monday in which Bill sold, the answer is in the "sold" node on the Bill-Monday records, i.e., there is only one such record. If we wanted to know the probability of that event relative to all the records, we would find the counter in the EOT elemental root node (or add up the counters in all the individual EOT nodes) to discover that this one sold record for Bill on Monday had a 1 in 15 probability in this KStore. Note again that this is done without reference to any tables, without having to characterize or reorganize the data, and without having to recompile any data or any subset thereof to get these kinds of answers. In a simple KStore such as this 15 record, field/record universe KStore the achievement seems trivial. Other queries to find anomalies (i.e. records that only occur once) or knowing that the current event is unique may also seem trivial. However when put into contexts of much larger data sets common in business and government and medical operations today, the implications for time saving and efficiency of resource usage are believed at the present time to be unfathomable.

There are 9 occurrences of the variable 'sold' in the 15 records of the data set above. If the application specified the variable "sold" as the subject variable and called the API Utility to return the number of instances of the variable "sold" the API Utility would locate the node for "sold" in the KStore structure and return the counter value of 9 from the end product node for "sold". (This FIG. 11 does not show anything below the end product nodes for the variables for this field/record universe). Next, the application would call the API Utility for the total number of records and be returned the counter value of 15 from the EOT node. The application would then calculate the probability of the focus variable 'sold', in all the records, as 9/15=0.6=60%.

It is clear enough from this very limited example how this can work, however, it is easier to see the power inherent in the system when the structure for the data is built into a KStore. If (for this level) end product nodes for Bill, Tom, Monday, Tuesday, and Sold (as well as one for each other variable of the set in the chart above) exist in the KStore constructed from this structure. In most preferred embodiments, each such end product node would have the number of Bill events, or the number of Tom events, and so forth, extant in the counter for that end product node. Thus, to answer the query, one would only need look at the number of records (EOT) counter, which would have 15 for the 15 records to get the total, and then look for the focus, "sold" end product node to get the values needed to answer the queries inherent in the questions asked above.

Figure 10:
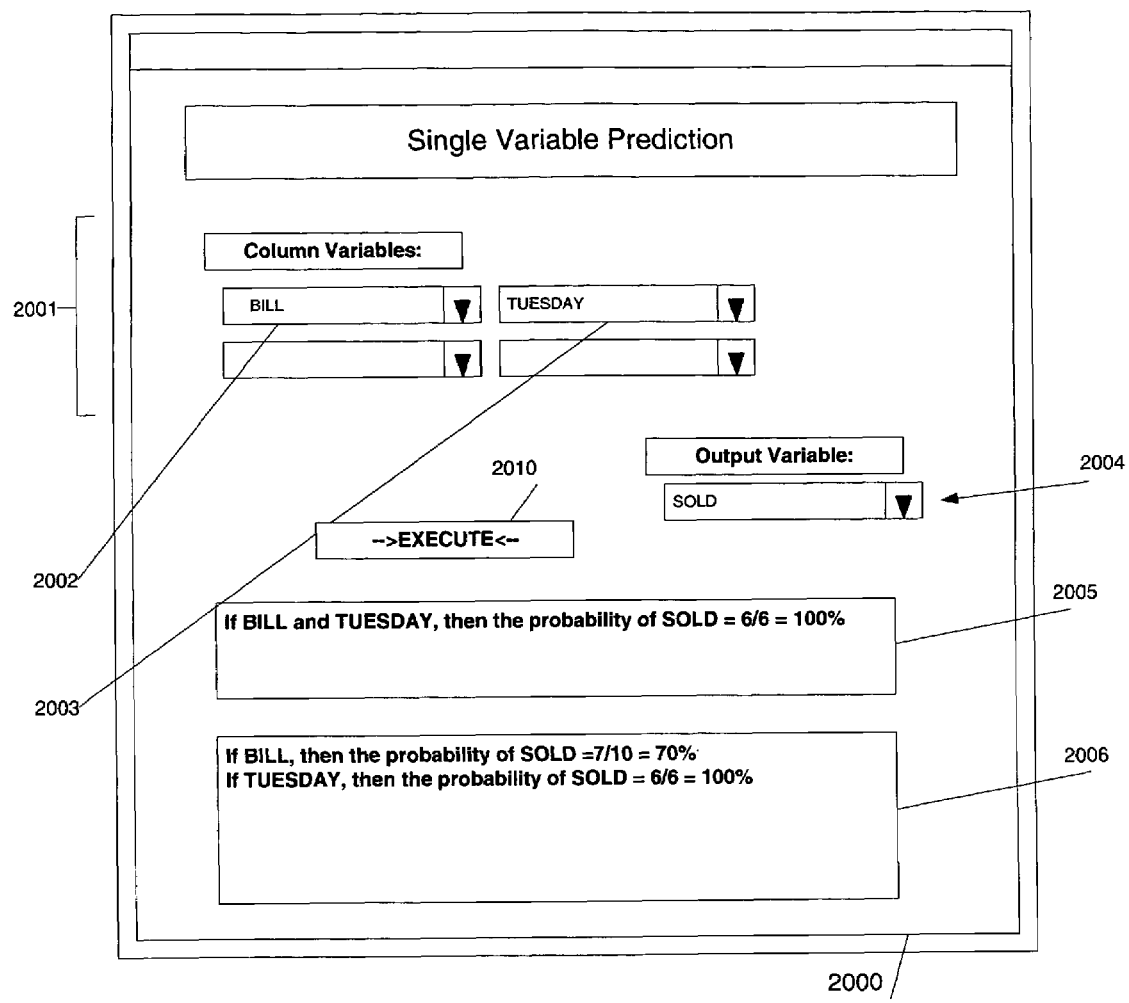
FIG. 10 is a display screen image of a single variable prediction GUI for use with or as a part of a preferred embodiment of the invention.

To see what a basic GUI may look like, refer to FIG. 10, when a GUI display 2000 has a context selection area 2001 and a focus selection area 2004. In this example, the column variable is a context or constraint, and the user has selected two; "Bill" in drop down list 2002, and "Tuesday," in drop down list 2003. The focus chosen by the user from the drop down selection in Output Variable 2004 is "sold." The answer is shown in area 2005 and additional details about the selected variables are in area 2006. When the Execute button 2010 is clicked or actuated, the GUI application will call the API Utility to process the constraints. The API Utility will traverse the K to create a list of only those records that contain both "Bill" and "Tuesday" and return the count. Next, the GUI application will call the API Utility to process the focus. Because a list or records containing both variables "Bill" and "Tuesday" has been established the API Utility will traverse only this set of records in K to determine the count of "sold" records.

Trend analysis is a series of single variable predictions using time, such as month, as the constraint. Thus if we expanded the example data to include a day of the month field and had a data set including an entire month, we could report out the number of solds over the days of the month and report the trend of the results. In such case, the application memory for the thread doing the trend analysis would hold the intermediate results and have a process for producing a trend from the total result within the time constraint chosen for the analysis. The intermediate results would be obtained by, for example, a single variable prediction function in the application as described above. This entire application supported trend analysis function could be chosen through a GUI which had a drop down list for the time constraint as well as the other drop down lists described above for single variable prediction.

In preferred embodiments, we have two types of API Utility components to the typical KStore system. One, an administrative API Utility component, is for maintenance, initiation, and change function support, which enables the user or a program to modify the various system components such as, by setting switches, state variables, designating data sources, modifying metadata or doing other things of an administrative nature. These settings that may for example control the functioning of a K Engine responsive to particles that may be on its sensor list. One such example could be designating certain particles as delimiters where a K Engine is expected to be responsive to a Field/Record universe of data. They may enable the user to initiate a second K Engine for accessing a single or more than one KStore within the system. Another function that may be handled in this way is the establishment of form and meaning for metadata in an input data stream or in a set of queries from particular query sources. This administrative API Utility type may be used to name particular KStores, to save them to long term storage, to return them to active system memory, in short, to accomplish any function other than the actual particle by particle message passing call operations of the system or query resolution. An illustration of a preferred embodiment of this administrative API Utility is pictured in FIG. 6B. The other API Utility type is used for queries, and is illustrated in FIG. 6A.

Figure 6A:
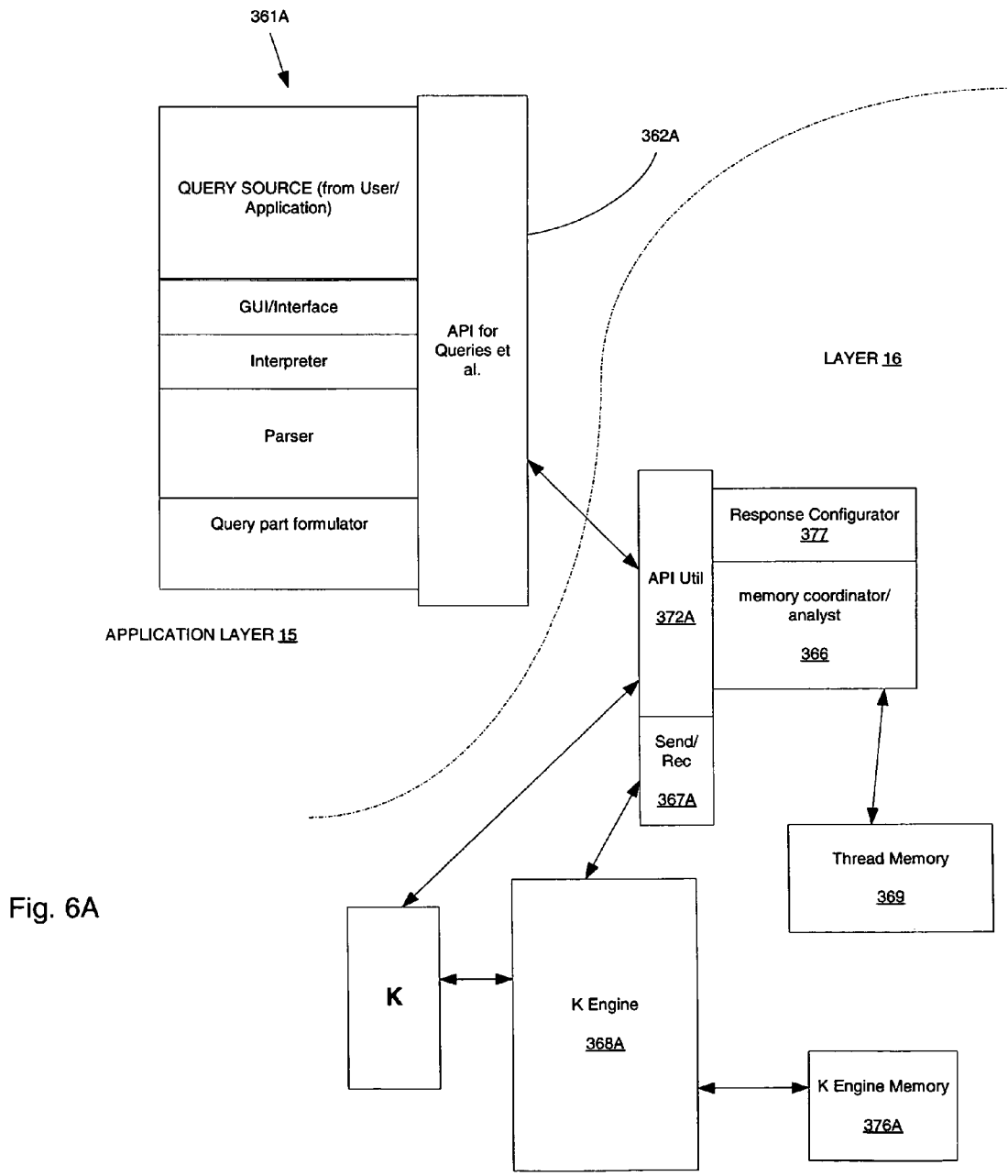
FIGS. 6A and 6B are block diagrams of a preferred embodiment API Utility components.
Figure 6B:
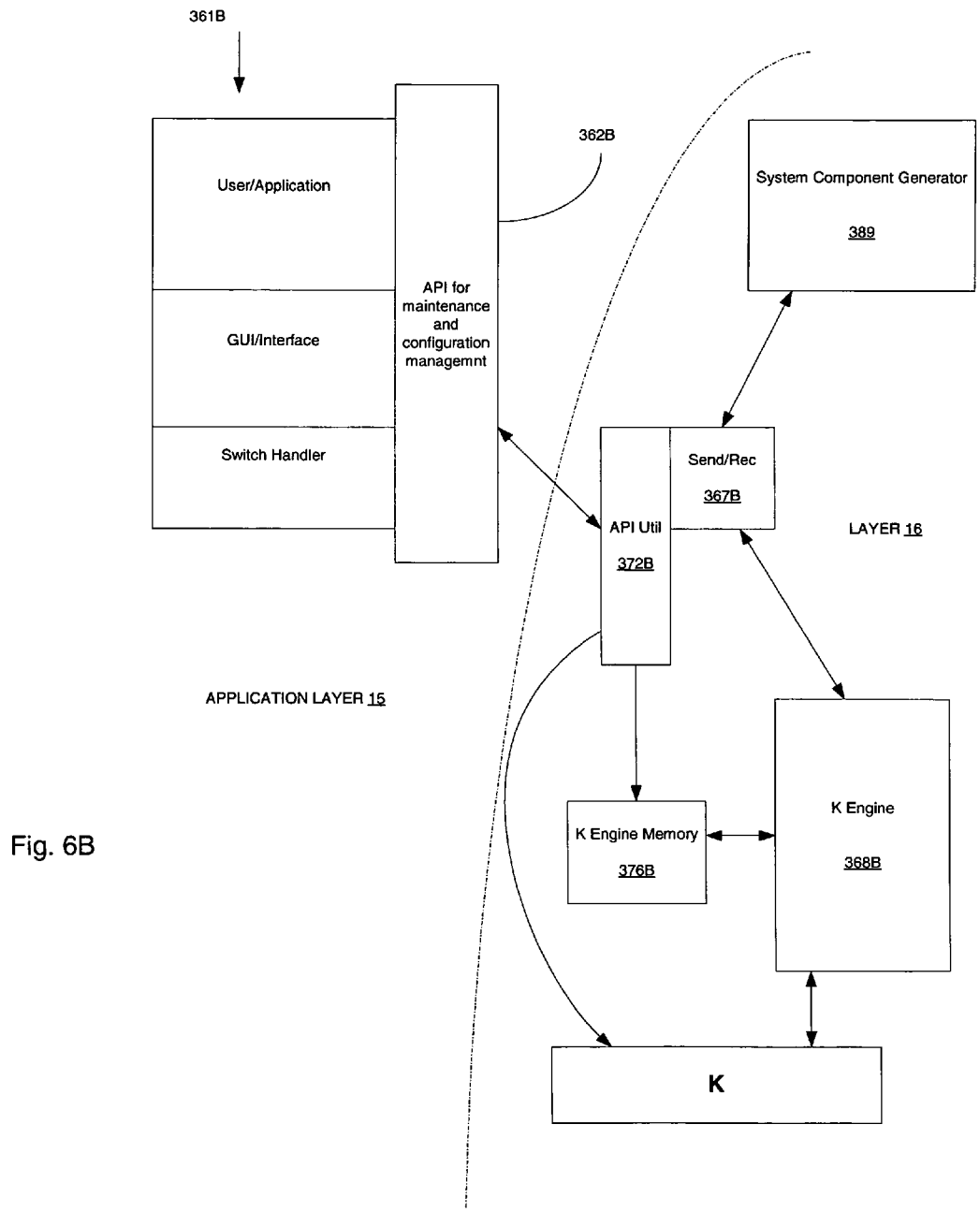

In FIG. 6B, the user or application that needs to adjust or initiate processing in the KStore system will access the state variables of interest through an interface 361B. In fact, the builder or user of the KStore system we describe here may build nearly any kind of interface structure in the applications layer he wants to. The only critical requirement in the applications layer 16 is that it communicate through an interface such as the API 372B which provides multiple routines to access the KEngine, K Structure and associated memory areas. One would expect that the arrangement of applications layer components would include a Switch Handler which will process these requests as needed, interpreting them appropriately for the system under consideration. For example, if a system is established with some number of different default settings to be set into an instance of a K Engine or K Engine and KStore combination for a given set of threads, a single command through the GUI or other interface may be used to choose the default most appropriate for the user's or the application's needs. Thus, the application will handle communication of this set of state variables to the API Utility segment 372B, which will make appropriate changes in the state variables and the like in the K Engine memory 376B or in K (and/or in K's associated state memory, not shown).

Additionally, it should be noted that the administrative routines of the API Utility of FIG. 6B will also (preferably) be called upon to instantiate the K Engine and set up the basic parameters used in the one or more KStores and that this K Engine instantiation will be called upon to build and/or access the K structure. The Utility segment together with the send/receive subcomponent will have the addresses and other information needed to contact a K Engine instantiator object, here illustrated as a System Component Generator 389. In this instantiation process, metadata such as what data in a particle is to be defined and operate as a delimiter, whether the Learn switch is to be on or off, and every relevant configuration variable will be established. As there are a vast number of ways to do this, after the understanding of the KStore system conveyed herein, the reader of ordinary skill in the programming arts will be able to put such ways into effect without undue experimentation and with relatively little programming effort or thought.

FIG. 6A illustrates the access to the API Utility software object for handling queries and the like. Again, nearly every item 361A in the applications layer may be configured by a system designer at will, so long as they communicate through a set of hooks or addresses provided by an API, here API 372A. The user or application will use such components in the applications layer to process a query through a GUI or other interface. An Interpreter will advantageously be provided to interpret the queries and may send feedback (not shown) if required to understand or comprehend the query. A parser can be used to determine the nature of the query relative to the algorithms this instance of API Utility has for handling queries. It will select which one(s) of API Utilities (i.e., the U's of FIG. 7) it will use. The query should be broken down into its component parts, perhaps by a query part formulator. These query parts will call the relevant API Utility component routines in 372A, which will call the K Engine 368A via the send/receive subcomponent 367A to locate a position in the K structure, access the K structure directly or update appropriate memory within the API Utility space. The K Engine will look to its own associated memory 376A to determine if what is sent is on the sensor list, how to respond to it, and the like. Other routines operate to coordinate memory in area 366 of the API Utility and to stand ready to analyze location information returned responsive to each query part. These other routines are designated subcomponent memory coordinator/analyst 366, and operate to store and retrieve associated data in a memory for handling the query thread, thread memory 369. The API Utility may keep records of previous positional information generated by earlier calls (i.e., current location counters returned by the K Engine in response to calls), it can go back with a new call using previous positional information to process current calls it needs to make to find higher levels of information such as the count of a subject variable within a context. The coordinator analyst 366 can also coordinate information previously retrieved from the previous calls that it may have stored in its thread memory and may produce the final result needed by the response configurator 377 to generate the answer to the query See for example the discussion of Single Variable Prediction above, taken together with the discussion on FIG. 10, an illustration of a GUI for setting up Single Variable Prediction queries. In association with the formulation and creation of parts of queries FIG. 6A, tables may need to be created and space dedicated to servicing the thread initiated by the query Q, so access to the thread memory by processes in the memory coordinator/analyst 366 are supplied. Responses are configured based on known information about the query which was used when the query was first understood. A subcomponent 377 of the API Utility will prepare the configuration of the response based on the information retrieved directly from the system memory by reference to KStore pointers and/or data retrieved from the system memory and manipulated by the table handler. The send/receive section 367B communicates with the K Engine.

Note that the API Utility component of the KStore system manages the environment of the Learn Engine. Accordingly, in preferred embodiments we use the API Utility in a special configuration (as detailed in the discussion of FIG. 6B) to modify the performance characteristics, the state, relevant triggers, etc cetera, of the KStore and the K Engine. The most common approach to doing this is to modify the state of switches pertaining to the KStore or the K Engine, or to any particular one of interest. In the GUI mode it could operate with pull down menus, icons or similar interface elements many of which are well known and any of which may be well suited to the task. An applications program needing to automatically set up some change in K Engine state could also do so by calling the API Utility component through traditional software techniques.

Figure 7:
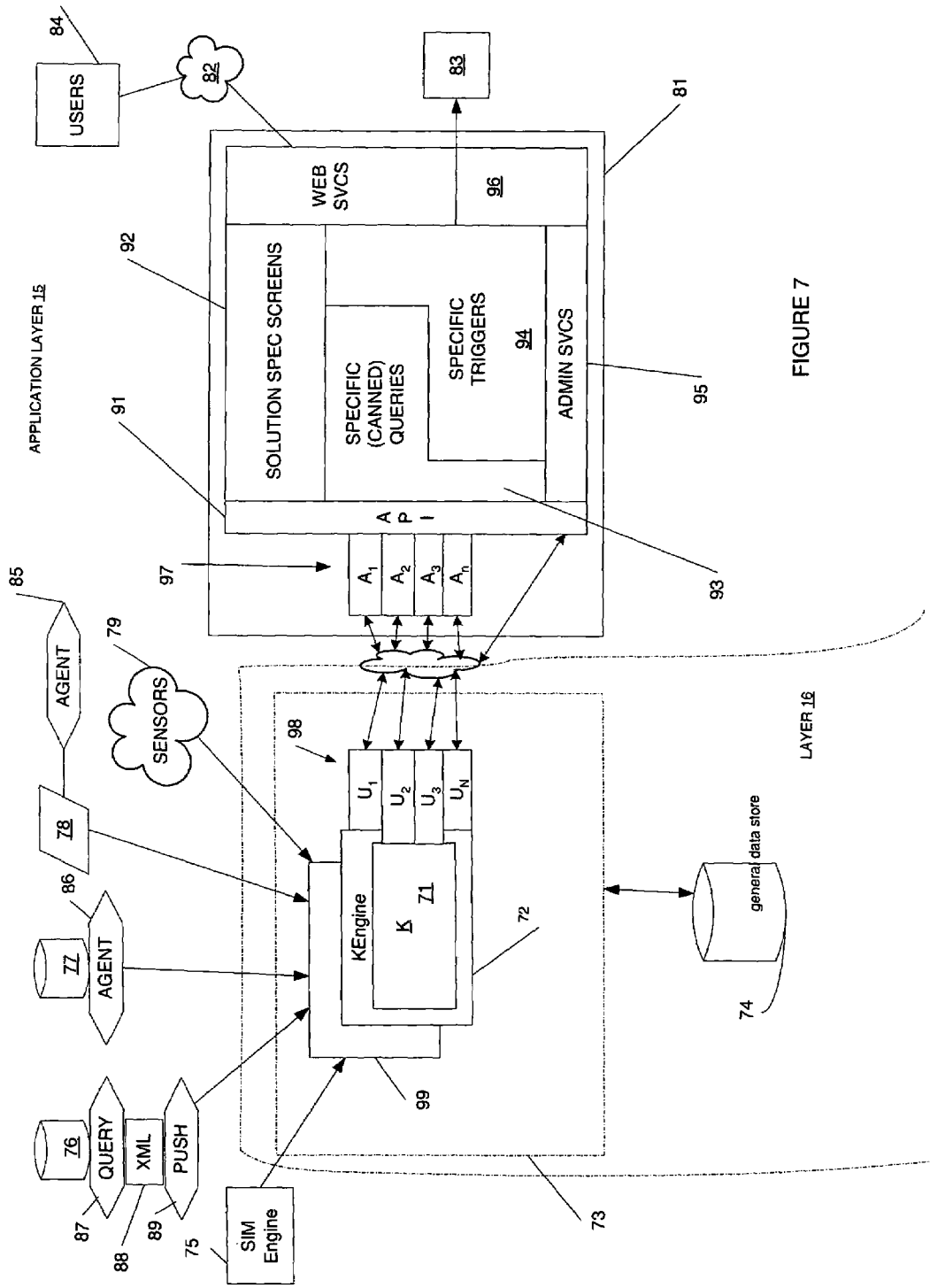
FIG. 7 is a block diagram of a KStore data structure in a working system in accord with preferred embodiments of this invention.

Refer now to FIG. 7, in which a detailed block diagram depicts many of the potential ways in which a K Store can be used and built in accord with preferred embodiments of this invention. The KStore 71 is in a server computer system 73. The server can be any kind of general purpose computing system, the ones we have used are multiprocessor systems that allow for multiple partitions. The data store 74 can be any kind of data storage system preferably closely tied to or part of a computer system (or server) 73 for convenient access. It can be used to keep backups, logs of activities or other functions as may be needed for a particular use of a KStore, or it can support other functions of the computer system 73. The K Engine 72 provides needed access to the KStore as detailed above. As described above, access to the K Engine itself is through either the Learn Engine or through an API Utility. In this illustration we have the API Utility broken into pieces, but the Learn Engine 99 is not. Generally there will be a single Learn Engine for each data source, but each Learn Engine will act as a single real time access facility for bringing the data from the source into the KStore at the same time that KStore can be queried by the Utilities 98.

Here we illustrate several different data source types, any of which can be used to build a KStore. The least change is required of a simulator 75 that generates data for testing, because it can generate it in particles and at whatever rate is desired, as no formatting is needed. (If it does generate particles, it will be incorporating at least most of the features of the Learn Engine. It is simpler to have it generate data and send the data to the Learn Engine to particlized the data.) A database 76 can be the data source also. Various ways to get the data out through queries of databases and the like, such as query 87 may be used. XML or other formatting 88 may be used to transfer the data from the native query format to a PUSH engine 89 that forwards the data stream to the Learn Engine 99. Another data source could be a flat file 77, which through a transfer agent (a thread) 86 provides its data to the Learn Engine 99. Computer input terminal 78 allows for input from an agent (or thread) 85. It is also possible that direct input from sensors could provide the data source to Learn Engine 99.

The query side is a bit more complex. The API Utilities are the Utilities portions 98 ($U_1$-$U_n$) that handle the calls to the K Engine and provide the interface to the data stores that track the lists of addresses that may be needed to organize the individual calls to satisfy a query. The A segments 97 can be a set of analytic applications that are provided so as to be chosen by the specific (unique or canned) queries 93. These queries are selected or constructed either by a user through solution specific screens 92, or directly through any means of access. There are two types of U portions in the API Utilities. Note that U2 and U3 connect directly to K71. This is drawn so as to call attention to the functionality in which API Utilities are able to directly access K. API Utility calls to KEngine, containing a particle and a current location point would be used to find the end product node for a sequence at lowest level, i.e. 'Bill'. Once the location counter for the end product of "Bill" was found other API Utility routines would use it to traverse the K structure directly and locate other information required to process a query i.e. the list of all records that contain 'Bill' which be the set of node pointers in the asResult list of the current location pointer.

Administrative services 95 provides for ways to set up the K, including determining the sensor set, delimiters and levels, and the like. The Administrative services 95 can also provide a way to control other switches, to set up the forms of the GUI, setting triggers, meta data, field and column names, in short, anything needed to manage and set up the use of a KStore. The specific triggers 94 refers to user or application predetermined standing queries that on the occurrence of specific events will take a specific action, such as sending an Email 83 to notify an owner of that trigger that the event has occurred. (These events could be any event, signal, or movement of an actuator, etc., constrained only by the reader's imagination at what could be done with a trigger generated signal.) The external triggers preferably work by setting up a separate thread to initiate specific queries at specified time intervals. The results of these queries can then be compared against previously defined limits. If the limit is reached (or a new event occurs, or a certain kind of event occurs), then a specific action occurs. The triggers can be coded as query applications and set on or off by switches using the Administrative services. Web services provide access to the Internet 82, through which users 84 may address the applications layer 81 to use any of these facilities in this layer.

It should be noted that a maintenance component can exist which provides flexibility and control. Such a maintenance component would be in the form of a software object such as an instance (or more than one) of an API Utility. In FIG. 7 it takes the form of the Admin function and any intervening parts between it and the K Engine. The various switches that might be included to define the nature of the Kstore can be expected to be accessed through an API Utility such as this maintenance component, although they could be made available through other API Utilities, but in such case, care should be taken to coordinate with the Learn Engines and other API Utilities that have access to this particular KStore. In the FIG. 1B illustration, we would suggest that these switches be associated with the K Engine or the KStore associated memory areas 28a and 28b. ("Switches" would be for items such as Learn (Yes or No), Column numbers (Yes or No), Meta Data field names used instead of column numbers (Yes or No), EOT levels (Number of and Names of); EOTCOL (column name), EOTVAR (variable), EOTFLD (field entry), EOTRCD (record)).

Triggers provide additional functionality and control of their settings may be handled in a manner similar to switches. Triggers can provide a powerful way to use the KStore to identify when data within it reaches some desired point or when a particular kind of data has crossed a threshold or the like. Many real-time analytic applications have a need to monitor when specific conditions occur in the knowledge base to start a series of actions in making decisions or recommendations to users or applications. Our inventive system provides an Event Trigger function to facilitate the monitoring process so that applications or users can respond to the triggering event occurring. Some conditions that can operate as an "event" are just a simple pattern match or a threshold check. Others are complex conditions that require a small programming effort to draw up conclusions.

The Event Trigger function in our preferred embodiment features the characteristics described in the following paragraphs.

Events (which can include conditions or occurrences) can be defined by KStore switch settings. Switch settings, i.e., state variables, can be hard coded into the K Engine, responsive to configuration settings set by users or applications that have access to the maintenance API Utility or similar facilitating structure as described just above. An application or user can be registered to receive notifications and this registered user or application can be different from the one setting the switches that define the events or conditions of interest. For example, when receiving a new value of a variable, and the condition of receiving a new value of a variable (a particular variable or any variable) is a set trigger for this K Engine, the K Engine sends an event notice to notify registered applications or users. Events are preferably defined by users, as may be the registration of specific applications. The basic event operations are registration and notification. Applications or users can use the registration operation to request their interests of receiving events based on a set of conditions. The registration process also permits applications to cancel the requests (or deregister them) when they are no longer needed. An agile event notification mechanism is helpful if one wishes to integrate with a variety of programming languages seamlessly. In other words the event notification mechanism preferably provides applications a way to add custom event handling in the applications' native language. Likewise a user-friendly GUI may be used to enhance the user's ability to attend to events and conditions by facilitating the needed switch settings.

Triggers (and associated switch settings) would thus be stored in the memory areas for the K Engine such as area 28a in FIG. 1B, and possibly in area 28b, if the trigger applied to global conditions for K. In preferred embodiments, the K Engine starts up a new thread to indicate that the event has been "triggered" (occurred). Notices would be sent via this additional thread (which could be seen as the thread from the API Utility 19a which, according to its own make up, may add or change data in its memory area 27a, and/or simply notify the application or user which is associated with instantiating this particular thread).

Triggers can be set up in two forms, internal and external. Internal triggers rely on the K Engine switch settings and generate threads responsive to activities occurring in the KStore as it occurs. For example, if a particle is not found on the sensor list, such a condition, given the right switch setting would be a trigger to initiate perhaps a notice to a monitoring application. An External trigger is one that operates by querying the KStore in a (usually) periodic or episodic time. The period or episode is managed in the API Utility that establishes the trigger, and it re-initiates a query to determine if a condition or event has occurred within the KStore, making this query to the K Engine and checking the result. Based on the result it determines in the API Utility whether the conditions of the trigger are met and acts accordingly.

A partial list of internal trigger switches might be New variable, New record, Fill in missing variables and log, or Verify selected fields, but numerous internal triggers based on events occurring in the KStore will occur to the reader.

While innumerable uses for this invention may be found, and significant variability in the form and manner of operation of this invention are described and will occur to those of skill in these arts, the invention is not limited in scope further than as set forth in the following claims.

What is claimed is:

1. A system component for accessing an interlocking trees datastore in an interlocking trees datastore system, said system component comprising:

a segment executing at least in part on a computer, said segment receiving calls from other system components, said other system components including at least one of a Learn Engine, said Learn Engine receiving data from at least one of a plurality of sources and transforming said data into particles, said particles added to said interlocking trees datastore by said segment or an API Utility, said API Utility processing inquiries for information from said interlocking trees datastore and processing requests to add information to said interlocking trees datastore, said segment finding a location within said interlocking trees datastore for a particle of said particles associated with at least a one of said calls, said interlocking trees datastore comprising a first tree depending from a first root node and including at least one of a plurality of branches, wherein each of the plurality of branches ends in an end product node comprising a leaf node, said interlocking trees datastore further comprising a second root of a second tree linked to each end product node, said interlocking trees datastore further comprising at least a third tree, wherein a root of the third tree comprises an elemental node representing a particle, the root of the third tree linked to at least one node in at least one branch of the first tree;

wherein the interlocking trees datastore comprises:
an interlocking trees datastore comprising a plurality of K nodes;
each K node of the plurality of nodes comprises a Case pointer and a Result pointer;
said Case pointer and said Result pointer pointing to two nodes from which said K node is formed;
said K node also comprising pointers to an asCase array and an asResult array;
said asCase array comprising pointers to nodes whose Case pointers point to said K node; and
said asResult array comprises pointers to nodes whose Result pointers point to said K node.

2. The system component of claim 1 wherein said system component is called a K Engine and said interlocking trees datastore is a KStore.

3. The system component of claim 1 wherein said system component builds said interlocking trees datastore only on condition a learn switch is in a learn state, said build accomplished by said system component recording said particle as an event in said interlocking trees datastore.

4. The system component of claim 1 wherein said system component receives from said other system components in said call, pointers associated with said particle, said pointers indicative of a current location in an interlocking trees datastore of said interlocking trees datastore system.

5. The system component of claim 1 wherein said system component has means to maintain a sensor list to compare sensors from said list to said particles, each of said sensors on said list associated to an elemental root node in said interlocking trees datastore.

6. The system of claim 5 wherein said pointers associated with said particle identify at least a last location within said interlocking trees datastore, and wherein said system component has link determining means which in response to determining that said last location is linked to a one of said elemental root nodes through a next subcomponent node, said link determining means establishes an existing location of said next subcomponent node linked to said elemental root node of said particle as a new current location in the interlocking trees datastore.

7. The system of claim 6 wherein said linked to one of said elemental root nodes is associated to a sensor on said sensor list which matches said particle.

8. The system of claim 6 wherein said link determining means also determines that said link from said last location to said elemental root node of said particle is indirect, wherein said indirectness is a determination that said particle is linked through a subcomponent node other than said next subcomponent node in said interlocking trees datastore.

9. The system of claim 6 wherein in response to said link determining means determining that said last location is linked to an elemental root node through a subcomponent node, the location of the next subcomponent node is established as the new current location and a counter in said elemental root node of said particle is caused by said link determining means to be incremented.

10. The system of claim 6 wherein said pointers associated with said particle identify at least a last location within said interlocking trees datastore, and wherein in response to determining said last location is determined by said link determining means not to be linked to an elemental root node through the next subcomponent node of said particle, then said system component causes the formation of a new subcomponent node for said particle in said interlocking trees datastore.

11. The system of claim 8 wherein in response to said link determining means determining that a particle is a termination of thought comprising a completion of an input entity, said system component activates a formation of end product node routine to cause the formation of an end product node in said interlocking trees datastore;
wherein the particle corresponds to data stored within the interlocking datastore used within the KStore;
the thought corresponds to data interconnected within the interlocking datastore as a sequence of K nodes that represent a sequence of events;
the termination of thought corresponds to a K node indicating an end of the sequence of k nodes corresponding to the end of a thought; and
the end of product node corresponds to the k node representing the termination of thought.

12. The system of claim 11 wherein said determination that a particle is a termination of thought depends upon finding a delimiter.

13. The system of claim 12 wherein in response to determining said delimiter is a delimiter for a higher level, adding end of thought nodes for each level between a current level and said higher level.

14. The system of claim 13 wherein in response to determining said delimiter is for said higher level is for a highest existing level, adding a subcomponent node above said highest level.

15. The system of claim 11 wherein a delimiter in a message communicating said particle to said system component will identify to said link determining means that said particle is a termination of thought.

16. The system of claim 12 wherein said sensor list contains at least one delimiter as a sensor.

17. The system of claim 11 wherein in response to determining said particle is found to be a termination of a thought, said system component adds information about said end product node as a monad to a monad list.

18. The system component of claim 4 wherein said system component provides feedback to other system components that send particles in messages, said feedback accomplished by returning location pointer data after a one of said particles is submitted to said system component, wherein said returned location pointer data identifies the location of the subcomponent node through which the system component will have established a link to said particle is in said interlocking trees datastore.

19. The system component of claim 15 wherein said particle is supplied by said API Utility system component, or from said Learn Engine system component.

20. The system component of claim 4 wherein said system component is coupled to a memory segment storing state variables identifiable as switches, said state variables being applicable to any actions of said system component, wherein said state variables determine how said system component reacts to calls from said other system components.

21. The system component of claim 4 wherein said system component comprises a memory segment storing state variables for actions of said system component, wherein settings of said state variables determine how said system component reacts to calls from said other system components.

22. The system component of claim 17 wherein said state variables stored in said memory segment comprises at least one switch from a list of switches comprising: Learn (Y or N), Column numbers (Y or N), Meta Data field names used instead of column numbers (Y or N), EOT levels (Number and names; EOTCOL (column name), EOTVAR (variable), EOTFLD (field entry), EOTRCD (record).

23. The system component of claim 17 wherein said additional information stored in said memory segment comprises at least one switch setting for enabling and disabling a trigger to store a notification signal from said system component to cause said system component to send said notification signal when a triggering event or condition has occurred.

24. The system component of claim 17 wherein said switches for enabling and disabling triggers stored in said memory segment comprises at least one trigger from the list of triggers comprising: New variable, New record, Fill in missing variables and log, or Verify selected fields.

25. The system component of claim 17 wherein said system component memory sensor list is managed by a sensor list manager of said system component, and wherein said sensor list manager operates in a configuration set by a state to determine a configuration in which to operate, said state being configurable by at least one switch, wherein in response to said sensor list manager receiving a particle that is not in said sensor list, said state sets said configuration to manage said particle that is not in said sensor list.

26. The sensor list manager of claim 25 wherein said configurable sensor list manager states comprise;
a state in which on the occurrence of receiving a particle that is not on said sensor list, no action is taken.

27. The sensor list manager of claim 25 wherein said configurable sensor list manager states comprise:
a state in which an error is sent on the occurrence of receiving said particle that is not on said sensor list.

28. The sensor list manager of claim 25 wherein said configurable sensor list manager states comprise:
a state in which a new sensor is added to said sensor list on the occurrence of said particle that is not on said sensor list.

29. The sensor list manager of claim 25 wherein said configurable sensor list manager states comprise:
a state in which a log is maintained to record said receipt of any said particles not on said sensor list.

30. The sensor list manager set forth in claim 25 wherein each of the sensor list manager states is set by a separate switch.

31. A method of accessing an interlocking trees datastore in an interlocking trees datastore system, said method comprising:
generating a call to a K Engine, said call requesting addition of a particle to said interlocking trees datastore and retrieval of pointer data from said interlocking trees datastore, said interlocking trees datastore comprising a first tree depending from a first root node and including at least one of a plurality of branches, wherein each of the plurality of branches ends in an end product node comprising a leaf node, said interlocking trees datastore further comprising a second root of a second tree linked to each end product node, said interlocking trees datastore further comprising at least a third tree, wherein a root of the third tree comprises an elemental node representing a particle, the root of the third tree linked to at least one node in at least one branch of the first tree,
processing in said K Engine, a response including said retrieved pointer data into a return message, and returning said return message:
wherein the interlocking trees datastore comprises:
an interlocking trees datastore comprising a plurality of K nodes;

each K node of the plurality of nodes comprises a Case pointer and a Result pointer;
said Case pointer and said Result pointer pointing to two nodes from which said K node is formed;
said K node also comprising pointers to an asCase array and an asResult array;
said asCase array comprising pointers to nodes whose Case pointers point to said K node; and
said asResult array comprises pointers to nodes whose Result pointers point to said K node.

32. The method of claim 31 further comprising the step;
generating a next call, said next call having a new particle and containing said retrieved pointer data.

33. The method of claim 31 wherein said method further comprises:
in response to determining that a learn switch is set to learn, also recording said particle as an event in said interlocking trees datastore.

34. The method of claim 33 wherein in response to determining that said interlocking trees datastore nodes have counters, and said switch is set to learn and said particle is equivalent to a previously recorded particle event, recording a new such particle by incrementing a counter in an elemental root node associated with said retrieved pointer data.

35. A method of accessing an interlocking trees datastore in an interlocking trees datastore system, said method comprising:
preparing a message to send a particle to a K Engine, said K Engine adding said particle to said interlocking trees datastore, wherein in said preparing, determining whether a next particle in a chain of thought being prepared to send as a call via said message to said K Engine is a branch particle event, and in response to determining that said next particle is a branch particle, sending current location data for a previous to a last subcomponent node in said message, said next particle recorded in said interlocking trees datastore comprising a first tree depending from a first root node and including at least one of a plurality of branches, wherein each of the plurality of branches ends in an end product node comprising a leaf node, said interlocking trees datastore further comprising a second root of a second tree linked to each end product node, said interlocking trees datastore further comprising at least a third tree, wherein a root of the third tree comprises an elemental node representing a particle, the root of the third tree linked to at least one node in at least one branch of the first tree;
wherein the interlocking trees datastore comprises:
an interlocking trees datastore comprising a plurality of K nodes;
each K node of the plurality of nodes comprises a Case pointer and a Result pointer;
said Case pointer and said Result pointer pointing to two nodes from which said K node is formed;
said K node also comprising pointers to an asCase array and an asResult array;
said asCase array comprising pointers to nodes whose Case pointers point to said K node; and
said asResult array comprises pointers to nodes whose Result pointers point to said K node.

* * * * *